US007522576B2

(12) United States Patent
Du et al.

(10) Patent No.: US 7,522,576 B2
(45) Date of Patent: Apr. 21, 2009

(54) DISTRIBUTED WIRELESS ACCESS METHOD BASED ON NETWORK ALLOCATION VECTOR TABLE AND APPARATUS OF THE SAME

(75) Inventors: Lei Du, Beijing (CN); Lan Chen, Beijing (CN)

(73) Assignee: NTT DoCoMo Inc., Toyko (JP)

( * ) Notice: Subject to any disclaimer, the term of this patent is extended or adjusted under 35 U.S.C. 154(b) by 354 days.

(21) Appl. No.: 11/286,995

(22) Filed: Nov. 22, 2005

(65) Prior Publication Data

US 2006/0114867 A1 Jun. 1, 2006

(30) Foreign Application Priority Data

Nov. 25, 2004 (CN) ........................ 2004 1 0009867

(51) Int. Cl.
*H04J 3/24* (2006.01)

(52) U.S. Cl. ........................................ 370/349; 370/338

(58) Field of Classification Search .......... 370/310–350
See application file for complete search history.

(56) References Cited

U.S. PATENT DOCUMENTS

2002/0071448 A1 6/2002 Cervello et al.
2005/0053015 A1* 3/2005 Jin et al. ..................... 370/254
2005/0058151 A1* 3/2005 Yeh ............................ 370/445
2006/0045048 A1* 3/2006 Kwon et al. ................ 370/329

OTHER PUBLICATIONS

Mathilde Benveniste, Avaya Labs, "Description of the CCC MMAC Protocol", Wireless LANs, IEEE P802.11. Jun. 29, 2005.
Fabrizio Talucci, et al. "MACA-BI (MACA by Invitation) A Receiver Oriented Access Protocol for Wireless Multihop Networks".
Vaduvur Bharghavan, et al. "MACAW: A Media Access Protocol for Wireless LANs". Department of Electrical Engineering and Computer Science. UC Berkeley.

* cited by examiner

*Primary Examiner*—Duc Nguyen
*Assistant Examiner*—Dai A Phuong
(74) *Attorney, Agent, or Firm*—Blakely, Sokoloff, Taylor & Zafman LLP

(57) ABSTRACT

Embodiments of the present invention include a wireless access method based on a NAVT (Network allocation vector table), which is applied to a distributed wireless mobile communication system comprising a plurality of nodes, the NAVT comprises a packet type field and a duration field and is stored in the respective nodes of the communication system, comprising: on a transmitting side, determining whether only a RTS (request to send) item is contained in the NAVT when a packet arrives; sensing channel to judge whether the channel is busy after determining that only the RTS item is contained in the NAVT; sending a RTS packet based on the RTS item to the receiving side after determining that the channel is busy; and on a receiving side, determining whether the NAVT is empty or not when the RTS packet is received; sending a CTS (clear to send) packet back to the transmitting side after determining that the NAVT is empty.

29 Claims, 11 Drawing Sheets

Fig. 8A

| 2byte | 2byte | 6byte | 6byte | 4byte |
|---|---|---|---|---|
| frame control | duration | receiving node address | transmitting node address | frame detecting sequence |

Fig. 8B

| 2byte | 2byte | 6byte | 4byte |
|---|---|---|---|
| frame control | duration | receiving node address | frame detecting sequence |

Fig. 9A

| duration | packet type |
|---|---|
| empty | empty |
| empty | empty |

Fig. 9B

| duration | packet type |
|---|---|
| $T_{RTS}$ | RTS |
| empty | empty |

Fig. 9C

| duration | packet type |
|---|---|
| $T_{CTS}$ | CTS |
| empty | empty |

Fig. 9D

| duration | packet type |
|---|---|
| $T_{RTS}$ | RTS |
| $T_{CTS}$ | CTS |

DISTRIBUTED WIRELESS ACCESS METHOD BASED ON NETWORK ALLOCATION VECTOR TABLE AND APPARATUS OF THE SAME

PRIORITY

The present patent application claims priority to and incorporates by reference the corresponding Chinese patent application serial no. 200410009867.X, titled, "Distributed Wireless Access Method Based on Network Allocation Vector Table and Apparatus of the Same," filed on Nov. 25, 2004.

BACKGROUND OF THE INVENTION

1. Field of the Invention

This invention relates to a wireless medium access control (MAC) technique. More specifically, the invention relates to a distributed wireless access method and apparatus based on a network allocation vector table which is applicable to point to point communication in a distributed wireless network, in order to improve the performances, such as throughput, of the system by solving the hidden/exposed terminal problems occurring in the wireless distributed network.

2. Description of the Prior Art

The wireless medium access control (MAC) technique can be classified into centralized control mode and distributed control mode in terms of control scheme. The centralized control mode means that a certain node which is present in a set of network nodes or a node which is specified according to a certain protocol is responsible for the radio resource allocation in the scope thereof to attain an effective share for the resources. Whereas no node in charge of the centralized control is present in the distributed control mode, and all the nodes in the distributed control mode are only responsible for controlling the information of themselves and commonly enjoying the right for accessing a channel. In such a distributed context, the share of the resources by the nodes is dependent on the design and practice of the distributed medium control method.

The MAC protocol characterized mainly by the centralized control is widely used in the existing WAN (wide area network). For example, a base station is used as a control node in the system such as GSM system or WCDMA system, to be responsible for the efficient access of the nodes within its range. Moreover, an access mode for performing a centralized control using an access point (AP) is also present in the WLAN (wireless local area network). As the coverage and the service demand further increases, the distributed MAC without a centralized control device corresponding thereto is becoming an efficient access mode due to its flexibility, such as an ad hoc network. An efficient MAC protocol is needed by a WLAN and the like to achieve an efficient sharing arrangement for the resources among respective nodes. However, since centralized control device is absent for performing resource allocation in a unified way, respective nodes independently control the transmission of their packets, and the problems due to hidden/exposed terminals occurring in the distributed network have become the main factors for affecting performance. That is, when two transmitting nodes are not within the sensing range of each other, and send packets to a same receiving node independently, a collision will occur between packets from the two different transmitting nodes at the receiving node, thereby leading to the degradation of the system performance. This is referred to as "hidden terminal problem". When two transmitting nodes are within the sensing range of each other, and their respective receiving nodes are not within the sensing ranges of each other, one of the two transmitting nodes could sense the packet transmission from the other transmitting node and thus inhibit its own packet transmission to the receiving node. Since the concurrent transmission between such two pairs of nodes would not lead to a mutual disturbance, the transmission that should have been performed is inhibited due to the sensing of the packet transmission from the ambient nodes. This leads to a waste of system resources and causes the exposed terminal problem.

Specifically, as shown in FIG. 1A, node B is located within the communication ranges of node A and node C, and node C is not located within the communication range of node A. If node A and node C send their respective dada packet to node B concurrently, a collision of these two data packets would occur at node B. This leads to the hidden terminal problem. As shown in FIG. 1B, node B is located within the communication range of node A, and node C is located within the communication range of node B and node D. Node C can not send a data packet due to the sensing of the data transmission from the ambient node B to node A, although the sending by node C at this time would not cause a disturbance on the data transmission between nodes A and node B. This leads to the exposed terminal problem.

In order to solve the hidden terminal problem to reduce the packet collision in the distributed network, IEEE 802.11 specifies the characteristics of medium access control (MAC) layer and physical layer for WLAN, wherein the MAC layer protocol defines point coordination function (PCF) for contention free period (CFP) and distributed coordination function (DCF) for contention period (CP), based on whether an access point is involved in the communication. As shown in FIG. 2, in the communication context without AP, DCF adopts the carrier sense multiple access with collision avoidance (CSMA/CA) protocol. When a packet arrives at a node, a channel is sensed. If the channel is busy, a backoff procedure is entered until the channel become idle and the idle time is equal to the DCF interframe space (DIFS). After the expiration of the backoff time, a short RTS (request to send) packet is transmitted, which includes a transmitting node address (TA), a receiving node address (RA) and a duration necessary for the completion of the transmission for the subsequent packets. The value of this duration is equal to the sum of the duration time necessary for transmitting its subsequent DATA packet, the time for transmitting a CTS (clear to send) packet and an ACK packet, and the time for three short interframe spaces (SIFS). On the contrary, if it is sensed that the channel is idle and the idle time is longer than or equal to the DCF interframe space (DIFS), this node would immediately send an RTS; and if the channel is idle but it is sensed that the channel is busy when the idle time does not reach DIFS, the node would enter the backoff procedure, and the RTS is sent after the expiration of the backoff time. After the receiving node correctly receives the RTS and waits for a short interframe space (SIFS), a short CTS (clear to send) is replied, which includes a receiving node address (RA) duplicated from TA (transmitting node address) of RTS and a duration necessary for the completion of the transmission for the subsequent packet. Herein, the duration is equal to the subtraction of the time for transmitting the CTS packet and the time for a SIFS from the duration in the received RTS. Upon successfully receiving the CTS, the transmitting node waits for a SIFS and sends a DATA (data) packet. Upon successfully receiving this packet, the receiving node sends an acknowledge packet (ACK) for confirmation.

In addition, 802.11 DCF defines a network allocation vector (NAV). As shown in FIG. 3, all non-receiving nodes or non-transmitting nodes which have received the RTS or CTS (the non-receiving node or non-transmitting node will be explained later) compare the values of the durations in these packets with the current values of the NAV, update the NAV with the larger value, and specify that all the nodes can initiate contention to access wireless channel only when their values of the NAV are zero. By using the handshaking procedure and carrier sense for RTS/CTS/DATA/ACK, and the virtual reservation of radio resources by the NAV, it is implemented by 802.11 DCF that when a pair of nodes are communicating, all the ambient nodes whose values of the NAV are not zero cannot access wireless channels, thereby ensuring a collision-free transmission of the packets.

Although 802.11 DCF has solved the hidden terminal problem, allowing the system performances to be improved as compared with the conventional distributed access modes such as CSMA, the problems such as the exposed terminal still restrict further improvement on the utilization rate of system resources. On one hand, some pairs of nodes which would originally cause disturbance on the current communication, that is, the exposed terminals, are inhibited from transmitting packets. This causes waste of radio resources. As shown in FIG. 4, during the communication procedure between node A and node B, node C which is located within the communication range of node A but not within the communication range of node B sets the NAV upon receiving the RTS packet transmitted from node A to node B, whose value is thus equal to the duration time in the RTS packet necessary for the completion of the transmission for the subsequent packets by nodes A and B. During the transmission of DATA packet from node A to node B, if a packet arrives at node C or a packet stored in its memory is waiting for transmission, the node C cannot send the packet because its value of the NAV is not zero.

On the other hand, the setting for the NAV makes some nodes, which can originally receive data, be inhibited from receiving packets. Specifically, as shown in FIG. 5, during the communication procedure between node A and node B, node F which is located within the communication range of node B but not within the communication range of node A sets the NAV upon receiving the CTS packet transmitted from node B to node A, whose value is thus equal to the duration time in CTS necessary for the completion of the transmission for the subsequent packets by nodes A and B. During the reception by node B of DATA packet from node A, if node F receives a RTS transmitted from a node E to node F itself, node F cannot transmit a CTS to respond the reception of RTS because its value of the NAV is not zero. However, in fact, receiving the data from the node E by node F would not cause a disturbance on receiving the data from node A by node B, thereby leading to the waste of resources and further leading to the unnecessary retransmissions when node E receives no response to the RTS. As such, although the conventional medium access control method based on the NAV reduces the collision caused by the hidden terminal to a certain degree at the receiving nodes, the above problems are still not solved and there is still a space for improving the utilization rate of system resources.

Therefore, a need exists for more efficient medium access control method to avoid the collision caused by the hidden terminal, allowing radio resources to be utilized more efficiently.

SUMMARY OF THE INVENTION

Embodiments of the present invention include a distributed wireless medium access control method, which is capable of reducing the packet collision and the waste of resources by solving the hidden terminal problem and the exposed terminal problem in the distribute wireless network, to thereby improve the system throughput and the utilization rate of resource.

According to one embodiment of the present invention, a wireless access method based on a NAVT(Network allocation vector table), which is applied to a distributed wireless mobile communication system comprising a plurality of nodes, the NAVT comprises a packet type field and a duration field and is stored in the respective nodes of the communication system, comprises: on a transmitting side, determining whether only a RTS(request to send) item is contained in the NAVT when a packet arrives; sensing channel to determine whether the channel is busy after determining that only the RTS item is contained in the NAVT; sending a RTS packet based on the RTS item to the receiving side after determining that the channel is busy; and on a receiving side, determining whether the NAVT is empty when the RTS packet is received; sending a CTS(clear to send) packet back to the transmitting side after determining that the NAVT is empty.

According to another embodiment of the present invention, a wireless access method based on a NAVT (Network Allocation Vector Table) in the case of no channel splitting, which is applied to a distributed wireless mobile communication system comprising a plurality of nodes, the NAVT comprises a packet type field and a duration field and is stored in the respective nodes of the communication system, comprises: on a transmitting side, determining whether only a RTS(request to send) item is contained in the NAVT when a packet arrives; sensing channel to determine whether the channel is busy or not after determining that only the RTS item is contained in the NAVT; fitting a data length and sending a RTS packet to the receiving side after determining that the channel is busy; and on a receiving side, determining whether the NAVT is empty or not when the RTS packet is received; sending a CTS (clear to send) packet back to the transmitting side after determining that the NAVT is empty.

Preferably, the NAVT is a two-dimension data table.

Preferably, the packet type field indicates packet types including RTS type and RTS type, and the duration field indicates the duration time for CTS item and RTS item.

Preferably, when the value of the duration field is reduced to zero, the RTS item or the CTS item in the NAVT corresponding to this duration is emptied.

Preferably, the method further comprises: on the transmitting side, sensing the channel is continued after determining that the channel is idle.

Preferably, the method further comprises: on the transmitting side, sensing channel to determine whether the channel is busy or not, after determining that the NAVT is empty; and sending a RTS packet immediately if the channel is idle in the DIFS, when the channel is idle, otherwise, entering a backoff procedure, and sending a RTS packet after the termination of the backoff procedure.

Preferably, the method further comprises: on the receiving side, terminating operation after determining that the NAVT is not empty.

Preferably, the method further comprises: on the receiving side, updating the NAVT by a non-receiving node when it receives the RTS packet.

Preferably, updating the NAVT by a non-receiving node comprises: determining whether a RTS item is contained in the NAVT; adding a RTS item in the NAVT, and duplicating the duration in the received RTS packet into the duration field of the RTS item in the NAVT, when no RTS item is contained in the NAVT; and selecting the larger one between the duration in the received RTS packet and the duration of the RTS item stored in the NAVT, to update the duration of the RTS item in the NAVT, when a RTS item is contained in the NAVT.

Preferably, the method further comprises: updating the NAVT by a non-transmitting node when it receives a CTS packet, after the CTS packet is sent back to the transmitting side.

Preferably, updating the NAVT by the non-transmitting node comprises: determining whether a CTS item is contained in the NAVT; adding a CTS item in the NAVT and duplicating the duration in the received CTS packet into the duration field of the CTS item in the NAVT, when no CTS item is contained in the NAVT; and selecting the larger one between the duration in the received CTS packet and the duration of the CTS item stored in the NAVT, to update the duration of the CTS item in the NAVT, when a CTS item is contained in the NAVT.

According to still another embodiment of the present invention, a wireless access method based on a NAVT (Network Allocation Vector Table) in the case of channel splitting, which is applied to distributed wireless mobile communication system comprising a plurality of nodes, the method comprises: on transmitting side, determining whether only a RTS (request to send) item is contained in the NAVT when a packet arrives; sensing DCH (data channel) to determine whether the DCH is busy when only the RTS item is contained in the NAVT; fitting a data length and sending a RTS packet on SCH (signaling channel) to the receiving side after determining that the DCH is busy; and on receiving side, determining whether only a CTS (clear to send) item is contained in the NAVT when the RTS packet is received; and fitting a data length and sending a CTS packet on the SCH back to the transmitting side when only the CTS item is contained in the NAVT or the NATV is empty.

According to another embodiment of the present invention, a node in a distributed wireless mobile communication system comprising a plurality of nodes, comprises: a NAVT storage timer unit for storing a NAVT comprising a packet type field and a duration field; a transmitting device for determining whether only a RTS (request to send) item is contained in the NAVT when a packet arrives; sensing channel to judge whether the channel is busy after determining that only the RTS item is contained in the NAVT; and fitting a data length and sending a RTS (request to send) packet to the receiving side after determining that the channel is busy; a receiving device for determining whether the NAVT is empty or not when the RTS packet is received; and sending a CTS (clear to send) packet back to the transmitting side after determining that the NAVT is empty.

According to another embodiment of the present invention, a node in a distributed wireless mobile communication system comprising a plurality of nodes in the case of no channel splitting, comprising: a NAVT storage timer unit for storing a NAVT comprising a packet type field and a duration field; a transmitting device for determining whether a only a RTS (request to send) item is contained in the NAVT when a packet arrives; sensing channel to determine whether the channel is busy or not after determining that only the RTS item is contained in the NAVT; and fitting a data length and sending a RTS packet to the receiving side after determining that the channel is busy; a receiving device for determining whether the NAVT is empty or not when the RTS packet is received; and sending a CTS (clear to send) packet back to the transmitting side after determining that the NAVT is empty.

Preferably, the transmitting device comprises: a transmitting storage unit for storing data packet that arrives at the node; a detection unit for determining whether a packet is to be transmitted in the transmitting storage unit, and checking an item of the NAVT in the NAVT storage timer unit; a determination unit for determining whether a CTS item is contained in the NAVT and whether the NAVT is empty or not based on the detection result from the detection unit; a channel sensing unit for sensing channel to determine whether the channel is busy or not based on the determining result from the determination unit; a data length fitting unit for fitting a data length after determining by the channel sensing device that the channel is busy; and a transmitting unit for transmitting a RTS packet to receiving side after determining by the channel sensing unit that the channel is busy, in a case where only RTS item is contained in the NAVT; sending a RTS packet immediately if the channel is idle in the DIFS, when it is determined by the channel sensing unit that the channel is idle, in a case where the NAVT is empty, otherwise, entering a backoff procedure, and sending a RTS packet after the termination of the backoff procedure; and transmitting a data packet to the receiving side when the transmitting node receives a CTS from the receiving node, and transmitting a CTS or ACK packet to the transmitting side when the receiving node receives a RTS packet and a DATA packet from the transmitting node.

Preferably, the receiving device comprises: a receiving storage unit for storing a packet received externally; a receiving unit for receiving a RTS and data packet from the transmitting side, and receiving a CTS and ACK packet from the receiving side; a detection unit for detecting whether or not correctly receiving packet or packet collision, detecting whether the node is a receiving node or not when a RTS packet and data packet is received; detecting whether the node is a transmitting node or not when a CTS and ACK packet is received; and detecting whether the NAVT is empty or not when a RTS packet is received; a determination unit for making a determination based on the detection result from the detection device; transmitting the determination result to the updating unit when the node is a non-receiving node and a RTS packet is received; transmitting the determination result to the updating unit when the node is a non-transmitting node and a CTS packet is received; and transmitting the determination result to the channel sensing unit when the node is a receiving node and the NAVT is empty; and assuming that the CTS or ACK packet from the receiving node is correctly received when the detecting unit detects that a packet collision occurs during a certain time; a channel sensing unit for sensing channel and transmitting a CTS packet when the received result indicates that the node is a receiving node and the NAVT is empty; and an updating unit for updating the NAVT when a non-receiving node receives a RTS packet and when a non-transmitting node receives a CTS packet based on the determination result from the determination unit.

Preferably, the NAVT storage timer unit includes a timer unit for controlling the value of the duration field in the NAVT.

According to another embodiment of the present invention, a node in a distributed wireless mobile communication system in the case of channel splitting, comprises: a NAVT storage timer unit for storing a NAVT comprising a packet type field and a duration field; a transmitting device for determining whether only a RTS (request to send) item is contained in the NAVT when a packet arrives; sensing DCH (data channel) to determine whether the DCH is busy when only the RTS item is contained in the NAVT; and fitting a data length and sending a RTS packet on SCH (signaling channel) to the receiving side after determining that the DCH is busy; a receiving device for determining whether only a CTS (clear to send) item is contained in NAVT when the receiving node receives a RTS packet; and fitting a data length and sending a CTS packet on the SCH back to the transmitting side after determining that only the CTS item is contained in the NAVT or the NATV is empty.

Preferably, one embodiment of the transmitting device comprises: a transmitting storage unit for storing data packet that arrives at the node; a detection unit for determining whether a packet is to be transmitted in the transmitting storage unit, and checking an item of the NAVT in the NAVT storage timer unit; a determination unit for determining whether a CTS item is contained in the NAVT and whether the NAVT is empty or not based on the detection result from the detection unit; a first channel selecting unit for selecting a channel based on the determination result from the determination unit; selecting a SCH (signaling channel) for sensing when the NAVT is empty, or selecting a DCH for sensing when only RTS item is contained in the NAVT; a channel sensing unit for sensing the channel to determine whether the channel is busy or not based on the selection by the first channel selecting unit; a data length fitting unit for fitting a data length after determining by the channel sensing device that the channel is busy; a second channel selecting unit for selecting a SCH when a RTS packet is to be transmitted, and selecting a DCH when a data packet is to be transmitted; and a transmitting unit for transmitting a RTS packet on the SCH to receiving side when it is determined by the channel sensing unit that the DCH is busy in a case where only RTS item is contained in the NAVT; sending a RTS packet on the SCH immediately if the channel is idle in the DIFS when it is determined by the channel sensing unit that the SCH is idle in a case where the NAVT is empty, otherwise, entering a backoff procedure, and sending a RTS packet on the SCH after the termination of the backoff procedure; and transmitting a data packet on the DCH to the receiving side when the transmitting node receives a CTS from the receiving node, and transmitting a CTS or ACK packet to the transmitting side when the receiving node receives a RTS packet and a DATA packet from the transmitting node.

Preferably, the receiving device comprises: a receiving storage unit for storing a packet received externally; a receiving unit for receiving a RTS packet from the transmitting side on the SCH; receiving a data packet from the transmitting side on the DCH, and receiving a CTS and REJ (rejection) packet from the receiving side on the SCH; a detection unit for detecting whether a packet is correctly received, detecting whether the node is a receiving node or not when a RTS packet and data packet is received on the SCH; detecting whether the node is a transmitting node or not when a CTS and ACK packet is received on the SCH; and detecting whether a RTS item is contained in the NAVT and whether the NAVT is empty or not when a RTS packet is received; a determination unit for making a determination based on the detection result from the detection device; transmitting the determination result to the updating unit when the node is a non-receiving node and a RTS packet is received; transmitting the determination result to the updating unit when the node is a non-transmitting node and a CTS packet is received; and transmitting the determination result to the data length fitting unit when the node is a receiving node and only CTS item is contained in the NAVT; a data length fitting unit for fitting a data length when the node is a receiving node and only CTS item is contained in the NAVT; a third channel selecting unit for selecting a SCH when a CTS and REJ packet is to be transmitted, and selecting a DCH when a data packet is to be transmitted; a channel sensing unit for sensing channel to transmit a CTS packet when the received result indicates that the node is a receiving node and no RTS item is contained in the NAVT; and an updating unit for updating the NAVT when a non-receiving node receives a RTS packet and when a non-transmitting node receives a CTS packet, based on the results of the determination from the determination unit.

Preferably, the NAVT storage timer unit includes a timer unit for controlling the value of the duration field in the NAVT.

BRIEF DESCRIPTION OF THE DRAWINGS

The above and other features and advantages of the present invention will become more apparent by describing in detail exemplary embodiments thereof with reference to the attached drawings, in which:

FIG. 8A is a diagram illustrating the format of the RTS packet used in the embodiment of the present invention; and FIG. 8B is a diagram illustrating the format of the CTS packet used in the embodiment of the present invention;

FIG. 9A is a diagram illustrating a NAVT table having no values;

FIG. 9B is a diagram illustrating a NAVT table having only RTS item;

FIG. 9C is a diagram illustrating a NAVT table having only CTS item; and

FIG. 9D is a diagram illustrating a NAVT table having both RTS item and CTS item;

DETAILED DESCRIPTION

One embodiment of the present invention is based on the distributed coordination function (DCF) in 802.11, that is, it still adopts the carrier sense and the handshaking procedure before the transmission of the data, but introduces a network vector allocation table (NAVT) to solve the exposed terminal problem yet not solved by DCF. In addition, by splitting the bandwidth shared by all nodes in the distributed wireless network into data channel and signaling channel, the problem of unnecessary retransmission is solved on the basis of the improvement of the utilization ratio of resources.

The preferred embodiment of the present invention will be described in detail below with reference to Figures. In these Figures, like reference symbols indicate the same or similar components.

Figure 1A:
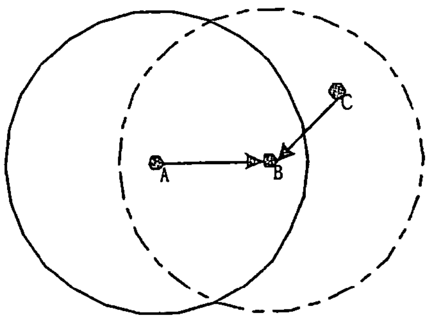
FIGS. 1A and 1B are diagrams illustrating respectively the hidden terminal problem and the exposed terminal problem in the distributed network.
Figure 1B:
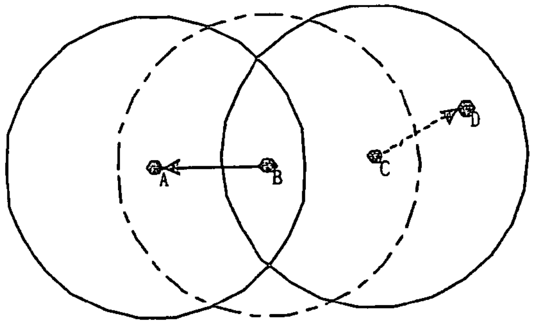
Figure 2:
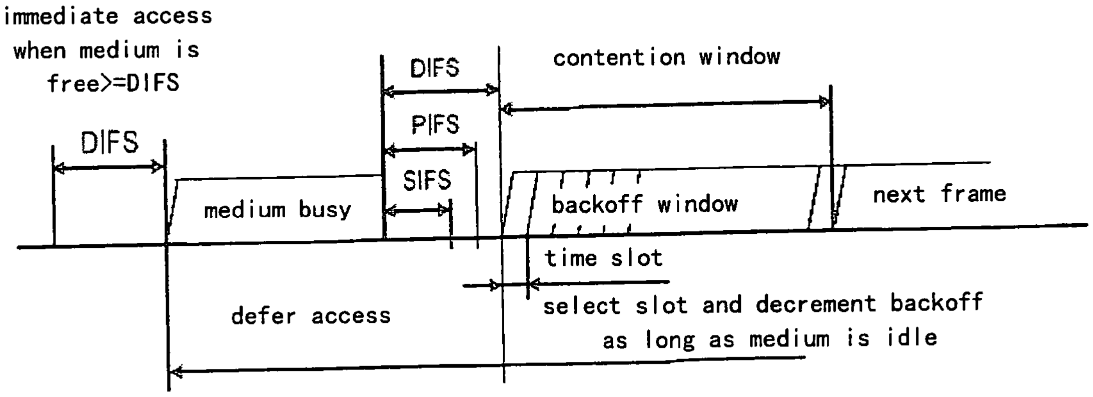
FIG. 2 is a diagram illustrating the basic access method in 802.11 DCF.
Figure 3:
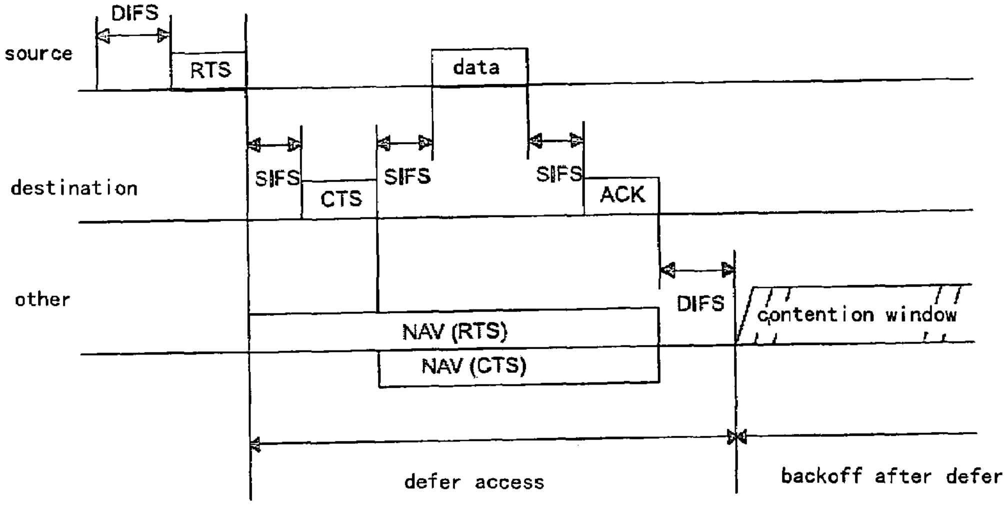
FIG. 3 is a diagram illustrating the RTS/CTS/DATA/ACK handshaking procedure in 802.11 DCF and the setting for the NAV.
Figure 4:
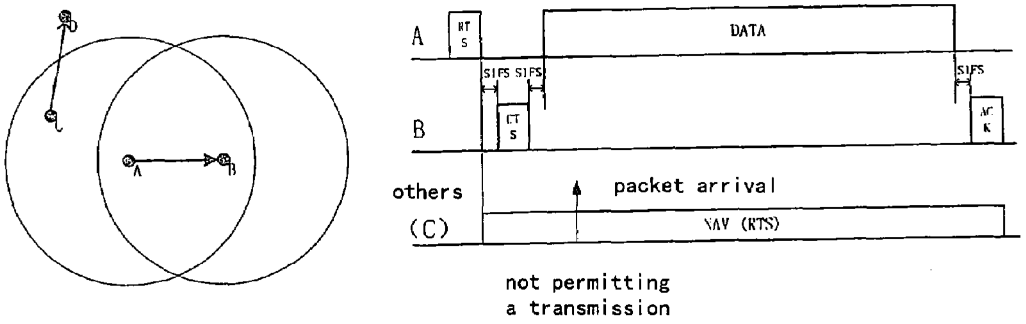
FIG. 4 is a diagram illustrating the exposed terminal problem in 802.11 DCF, wherein the hidden terminal is inhibited from transmitting packets due to the set for the NAV, leading to the waste of resources.
Figure 5:
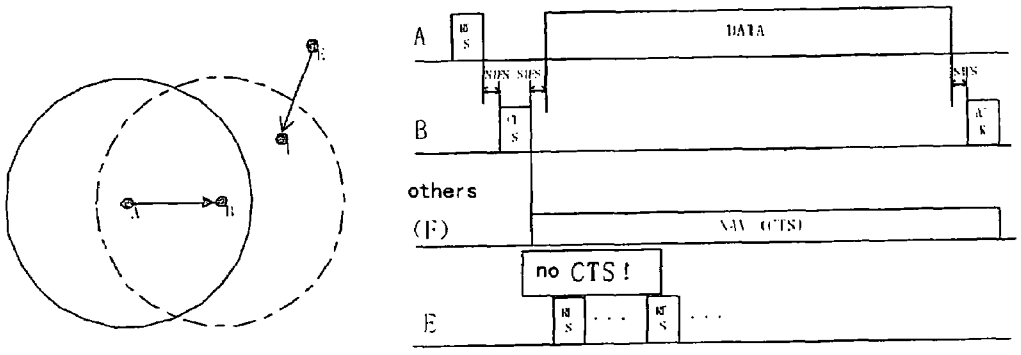
FIG. 5 is a diagram illustrating the problem of unnecessary retransmission and resource waste in 802.11 DCF, wherein a node, which is within the communication range of the receiving node but not within the communication range of the transmitting node, is inhibited from transmitting the CTS packet due to the set for the NAV, to thereby not be allowed to receive the data simultaneously, leading to the unnecessary retransmission by the transmitting node and the resource waste.
Figure 6:
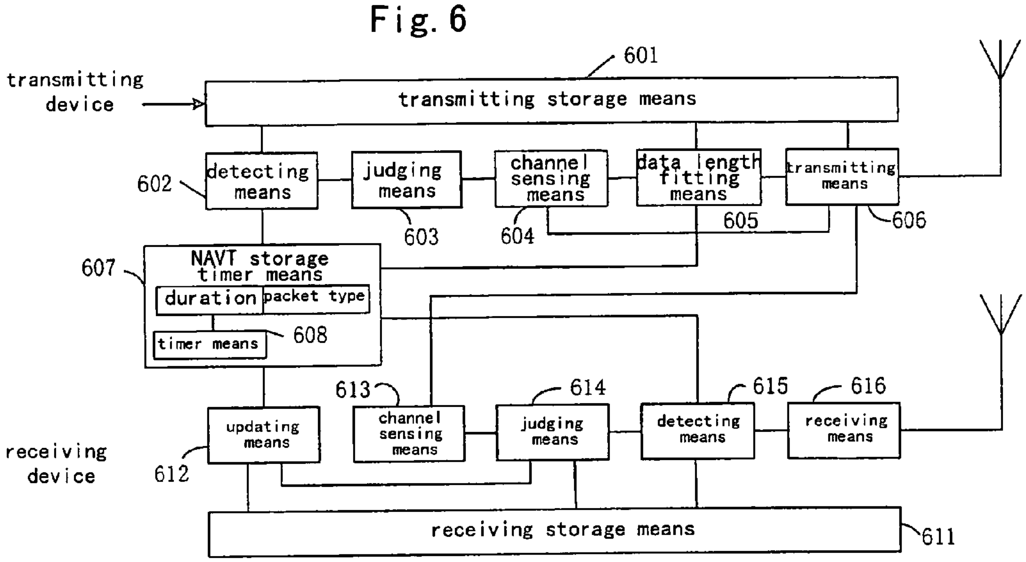
FIG. 6 is a diagram illustrating the configuration of any node for implementing the present invention, in a case where it has no split channel according to one embodiment of the present invention.

Firstly, with reference to FIG. 6, FIG. 6 is a diagram illustrating the configuration of any node for implementing the present invention in the case where it has no split channels according to one embodiment of the present invention.

As shown in FIG. 6, the node includes a transmitting device and a receiving device. The transmitting device includes a transmitting storage unit 601, a detecting unit 602, a determination unit 603, a channel sensing unit 604, a data length fitting unit 605 and a transmitting unit 606. The receiving device includes a receiving storage unit 611, an updating unit 612, a channel sensing unit 613, a determination unit 614, a detecting unit 615 and a receiving unit 616. In addition, the node further includes a NAVT storage timer unit 607 commonly used by the transmitting unit and receiving unit, the NAVT storage timer unit 607 includes a timer unit 608.

Specifically, the transmitting storage unit 601 stores the data packet arriving at the current node. The detecting unit 602 detects whether a packet in the transmitting storage unit 601 is to be transmitted or not, detects whether there is a item CTS in the current packet type field in the NAVT storage timer unit 607 of this node, in presence of a packet to be transmitted, and sends the detected result to the determination unit 603. The determination unit 603 determines based on the result detected by the detecting unit 602. If no item CTS is included in the current NAVT, the node sends this determination result to the channel sensing unit 604 and is ready for sensing channel. On the contrary, the NAVT storage timer unit 607 would be detected continuously until the above condition is met. The channel sensing unit 604 senses channel based on the determination results from the determination unit 603. If the determination unit 603 indicates that the current NAVT is empty, the node will sense whether the channel is idle or not. If the channel is in idle status during DIFS interval, the node will send RTS packet through the transmitting unit 606 immediately after the DIFS interval. Otherwise, the node will enter a backoff procedure and send a RTS packet through the transmitting unit 606 after the expiration of the backoff time. If the determination unit 603 indicates that only an item RTS is included in the current NAVT, the node will sense whether the channel is busy or not. If the channel is busy, the node initiates a data length fitting and prepares for sending RTS or DATA packet. The data length fitting unit 605 compares the value of the current duration field in the NAVT with the time necessary for transmitting the packet to be transmitted in the transmitting storage unit 601 so that the length of the fitted packet meets the following condition: the time necessary for transmitting the fitted packet is equal to the smaller one between the time necessary for the transmission of the current packet to be transmitted and the value in the current duration field in the NAVT. The transmitting unit 606 transmits the data packets to be transmitted in storage unit based on the result obtained from the channel sensing unit 604, or generates a RTS packet having duration necessary for transmitting the fitted data packet, or transmits a CTS or ACK packet in response to the reception of packet by the receiving device.

The receiving unit 616 receives a packet from the radio interface, and sends the received data into the detecting unit 615. The detecting unit 615 detects whether a packet or a packet collision is correctly received from the radio interface, and stores the correctly received packet into the receiving storage unit 611. Moreover, the detecting unit 615 detects whether the field of receiving node address in the correctly received packet matches with the address of the current node, that is, whether the current node is a receiving node or not. When the RTS packet is correctly received and the current node is a receiving node, the detecting unit 615 detects whether the NAVT storage timer unit 607 of the current node is empty or not, and sends the detected result into the determination unit 614. The determination unit 614 makes a determination based on the result detected by the detecting unit 615. That is, if the current node is a non-receiving node and receives a RTS packet, the node sends the determination result into the updating unit 612. If the current node is a non-receiving node and receives a data packet, the node sends the determination result into the receiving storage unit 611 and then deletes the packet. If the current node is a receiving node and the result detected by the detecting unit 615 indicates that the current NAVT is empty, the node sends the determination result into the channel sensing unit 613 and prepares for sensing channel. If the detecting unit 602 detects that a packet collision occurs in a certain time, it is assumed that the CTS packet or the acknowledge packet from the receiving node is correctly received. When the determination result from the determination unit 614 indicates that the RTS is received and the NAVT is empty, the channel sensing unit 613 senses the time interval of the SIFS on the channel, and sends a CTS packet after the time interval. When the determination result from the determination unit 614 indicates that the current node is not a non-receiving node, the updating unit 612 compares the value of the duration field in the received RTS with the value of the duration in the current NAVT table, and selects the larger value to update the NAVT table. If the current NAVT is empty, the node sends this determination result into the channel sensing unit 613. The receiving storage unit 611 stores the packet received from the radio interface.

In addition, the NAVT storage timer unit 607 commonly used by the receiving device and the transmitting device in the node records the current situation of the ambient nodes around the node, including whether a node around the node is transmitting or receiving data. The NAVT storage timer unit 607 has a two-dimension storage space for storing the duration field and the packet type field. The value of the duration is controlled by the timer unit 608.

Figure 7:
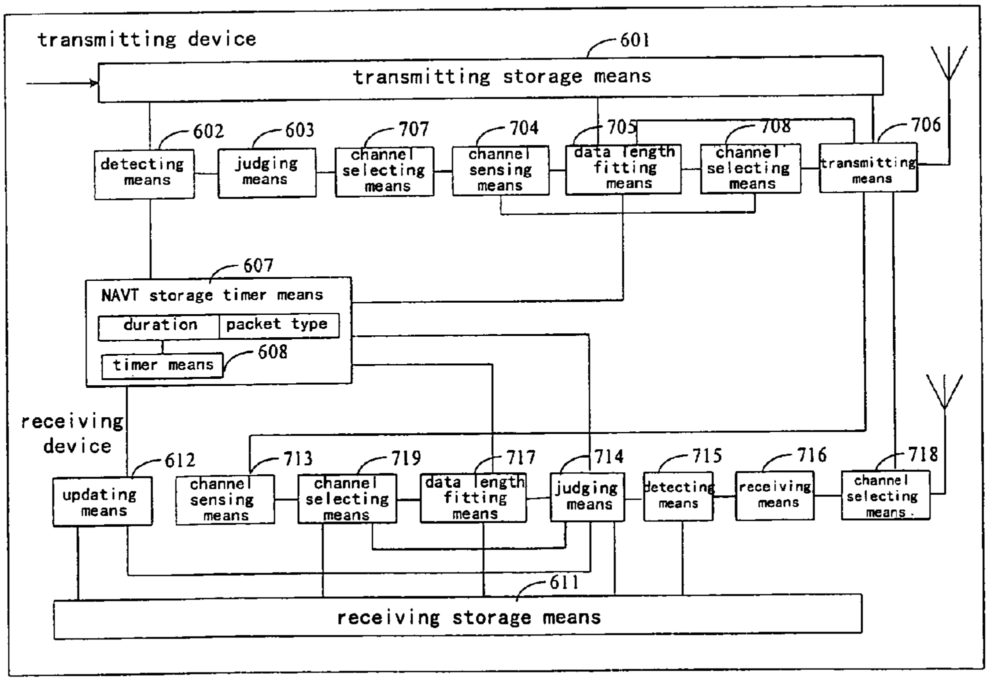
FIG. 7 is a diagram illustrating the configuration of any node for implementing the present invention, in a case where it has split channel according to one embodiment of the present invention.

Next, referring to FIG. 7, FIG. 7 is a diagram illustrating the configuration of any node for implementing the present invention in the case where it has split channel according to one embodiment of the present invention.

As shown in FIG. 7, the node includes a transmitting device and a receiving device. The transmitting device includes a transmitting storage unit 601, a detecting unit 602, a determination unit 603, a channel sensing unit 704, a data length fitting unit 705, a transmitting unit 706, a channel selecting unit 707 and a channel selecting unit 708. The receiving device includes a receiving storage unit 611, an updating unit 612, a channel sensing unit 713, a determination unit 714, a detecting unit 715, a receiving unit 716, a data length fitting unit 717, a channel selecting unit 718 and a channel selecting unit 719. In addition, the node further includes a NAVT storage timer unit 607 commonly used by the transmitting unit and receiving unit, the NAVT storage timer unit 607 includes a timer unit 608.

Only unit in the node which are different from those in the case where it has no split channel will be described below.

Specifically, the channel selecting unit 707 in the node selects a signaling channel (SCH) and a data channel (DCH) based on the determination result from the determination unit 603. If the determination unit 603 indicates that the current NAVT is empty, the channel selecting unit 707 will select the signaling channel; and if the determination unit 603 indicates that only an item RTS is included in the current NAVT, the channel selecting unit 707 will select the data channel. The channel sensing unit 704 senses the channel indicated by the channel selecting unit 707. If the channel selecting unit 707 indicates that the signaling channel (SCH) is selected, the node senses whether SCH is idle or not. If the SCH is in idle status during DIFS interval, the node will send RTS packet on the SCH through the transmitting unit 706 immediately after the DIFS interval. Otherwise, the node will enter a backoff procedure and send a RTS packet on the SCH through the transmitting unit 706 after the expiration of the backoff time. If the channel selecting unit 707 indicates that the data channel (DCH) is selected, the node senses whether the DCH is busy or not, and performs a data length fitting and prepares for transmitting a packet when the channel is busy. The data length fitting unit 705 compares the value of the current duration field in the NAVT with the time necessary for transmitting a packet to be transmitted in the transmitting storage unit 601 so that the length of the fitted packet meets the following condition: the time necessary for transmitting the fitted packet is equal to the smaller one between the time necessary for the transmission of the current packet to be transmitted on the DCH and the value in the current duration field in the NAVT. The channel selecting unit 708 receives the result from the data length fitting unit 705 and selects the signaling channel (SCH). The transmitting unit 706 generates and transmits the RTS packet based on the result obtained from the channel sensing unit 704, and its duration is the sum of the time necessary for transmitting the data packet to be transmitted on DCH in the storage unit and the time necessary for transmitting the control packet on the SCH. Further, the transmitting unit 706 transmits the RTS packet on the SCH indicated by the channel selecting unit 708 based on the result from the data length fitting unit 705, and its duration is the sum of time necessary for transmitting the data packets having the fitted length on the DCH and the time necessary for transmitting the control packets on the SCH. Furthermore, the transmitting unit 706 informs the receiving device to make a channel selection, receives the request for transmitting packets from the receiving device, and generates and sends the corresponding packet.

In the receiving device, the channel selecting unit 718 selects a corresponding channel based on the result from the transmitting unit 706. That is, if the transmitting unit 706 transmits a CTS packet, the node selects a data channel to prepare for receiving; and if the transmitting unit 706 transmits a data packet, the node selects a signaling channel to prepare for receiving. The receiving unit 716 receives the packet on the channel indicated by the channel selecting unit 718, and sends the received packet into the detecting unit 715. The detecting unit 715 detects whether the packet is correctly received, and store the correctly received packet into the receiving storage unit 611; and detects whether the field of receiving node address in the correctly received packet matches with the address of the current node, that is, whether the current node is a receiving node or not. When the RTS packet is correctly received and the current node is a receiving node, the detecting unit 715 detects whether an item RTS is included in the NAVT storage timer unit 607 of the current node or not, and sends the detected result into the determination unit 714. The determination unit 714 makes a determination based on the result detected by the detecting unit 715. That is, if the detecting unit 715 indicates that the current node is a non-receiving node, the determination unit 714 sends the determination result into the updating unit 612 to update the NAVT storage timer unit 607, and deletes the packet in the receiving storage unit 611. If the detecting unit 715 indicates that the current node is a receiving node and the current NAVT table stored in the NAVT storage timer unit 607 is as shown in FIG. 9A, the determination unit 714 sends the result into the channel selecting unit 719 to sense channels to thereby prepare for transmitting the CTS packet. If the detecting unit 715 indicates that the current node is a receiving node and the current NAVT table stored in the NAVT storage timer unit 607 is as shown in FIG. 9C, the determination unit 714 sends the determination result into the data length fitting unit 717 for data fitting. If the detecting unit 715 indicates that the current node is a receiving node and the current NAVT table stored in the NAVT storage timer unit 607 is as shown in FIG. 9B or FIG. 9D, the determination unit 714 sends the determination result into the channel selecting unit 719 to select the signaling channel to thereby prepare for transmitting a rejection packet (REJ). The data length fitting unit 717 compares the value of the current duration field in the NAVT with the time necessary for transmitting the subsequent data packet, contained in the RTS packet justly received by the storage unit for receiving 611 so that the length of the fitted packet meets the following condition: the time necessary for transmitting the fitted packet is equal to the smaller one between the time necessary for the transmission of the current packet to be transmitted on DCH and the value in the current duration field in the NAVT. The channel selecting unit 719 determines which channel to be selected based on the determination result indicated by the determination unit 714. That is, if a RTS packet is received and the current NAVT table stored in the NAVT storage timer unit 607 is as shown in FIG. 9A, the SCH channel is then selected to sense the channel to thereby prepare for transmitting the CTS packet. If a RTS packet is received and the current NAVT table stored in the NAVT storage timer unit 607 is as shown in FIG. 9B or 9D, the SCH channel is then selected to sense the channel to thereby prepare for transmitting the REJ packet. If a CTS packet is received, the DCH channel is then selected to sense the channel to thereby prepare for transmitting the DATA packet. If a data packet is received, the SCH channel or DCH channel is then selected to prepare for transmitting the ACK packet. If an ACK packet is received, the SCH channel is then selected and the operation is terminated. Moreover, the channel selecting unit 719 selects the signaling channel to sense the channel based on the result from the data length fitting unit 717, and prepares for transmitting a CTS packet having the fitted data length. The channel sensing unit 713 senses the channel indicated by the channel selecting unit 719 and sends the result into the transmitting unit 706 to prepare for transmitting the packet.

FIG. 8A is a diagram illustrating the format of the RTS packet used in the embodiment of the present invention. As shown in FIG. 8A, the frame control field includes 2 bytes of frame control bit information as specified in 802.11 protocol. The duration field refers to the sum of the time necessary for performing the transmission for the subsequent data or management packet plus with the time necessary for transmitting one CTS frame, one ACK frame and three SIFSs interframe space, in unit of microsecond. The calculated result is rounded up if it contains a decimal portion. In case of channel splitting, the duration field refers to the sum of the time necessary for performing the transmission for the subsequent data packet plus with the time necessary for transmitting one CTS frame, one ACK frame and three SIFSs interframe space on SCH. The receiving node address field relates to the node address directed by the data or control frame to be transmitted, and the node herein is referred to as a receiving node. In the present specification, it is defined that a node which the receiving node address included in the received packet matches with the address of the node is referred to as a receiving node. On the contrary, a node which the receiving node address included in the received packet does not match with the address of the node is referred to as a non-receiving node. The transmitting node address field relates to the address of the node for transmitting this RTS packet. By way of an example, the lengths of the respective fields are given in FIG. 8A.

FIG. 8B is a diagram illustrating the format of the CTS packet used in the embodiment of the present invention. As shown in FIG. 8B, the description of the frame control field and the frame detecting sequence is the same as that of the format of RTS packet. The value of the receiving node address field is duplicated from the transmitting node address in the received RTS packet. In the present specification, it is defined that a node, among the nodes receiving the CTS, whose node address matches with this transmitting node address is referred to as a transmitting node. On the contrary, a node, among the nodes receiving the CTS, whose node address does not match with this transmitting node address is referred to as a non-transmitting node. The value of the duration field is equal to the subtraction of one SIFS and the time for transmitting a CTS packet from the value of the duration field in the received RTS packet, in unit of microsecond. The calculated result is rounded up if it contains a decimal portion. In case of channel spitting, the value of the duration field is equal to the subtraction of one SIFS and the time for transmitting a CTS frame on the SCH from the value of the duration field included in the received RTS packet.

The configuration of NAVT table is described below with reference to FIGS. 9A, 9B, 9C and 9D. FIGS. 9A, 9B, 9C and 9D respectively illustrate the contents in the NAVT table in four different conditions. For the convenience of explanation, the NAVT table is shown as a two-dimension data table in FIGS. 9A, 9B, 9C and 9D, in which the packet type field indicates whether the received packet is a RTS or a CTS packet; and the duration field is duplicated from the duration field of the received RTS or CTS packet. However, it is obvious for those skilled in the art that the configuration of the NAVT table according to the invention is not limited thereto, but can have any configuration of similar functions.

FIG. 9A indicates that no other node in the sensing range of the current node is transmitting or receiving data. As shown in FIG. 9A, since the current node does not receive any RTS or CTS packet, its NAVT is empty.

FIG. 9B indicates that other nodes in the sensing range of the current node are transmitting data. When the node receives the RTS packet from the other nodes and does not receive the CTS packet from the other nodes, the node adds the item RTS into the packet type field of the NAVT itself, and duplicates and stores the value of the duration field in the received RTS packet into the corresponding duration field of the NAVT itself. At this time, the NAVT table has only a row, and the other row is empty, as shown in FIG. 9B.

FIG. 9C indicates that other nodes in the sensing range of the current node are receiving data. When the node receives the CTS packet from the other nodes and does not receive the RTS packet from the other nodes, the current node adds the item CTS into the packet type field of the NAVT itself, and duplicates and stores the value of the duration field in the received CTS packet into the corresponding duration field of the NAVT itself. At this time, the NAVT table has only a row, and the other row is empty, as shown in FIG. 9C.

FIG. 9D indicates that there are both nodes receiving data and nodes transmitting data in the sensing range of the current node. When the current node receives the RTS or the CTS packet from other nodes, the current node adds the item the packet type into the packet type field of the NAVT itself, and duplicates and stores the value of the duration field in the received packet into the corresponding duration field of the NAVT itself. At this time, both rows of the NAVT have values, as shown in FIG. 9D.

Figure 10:
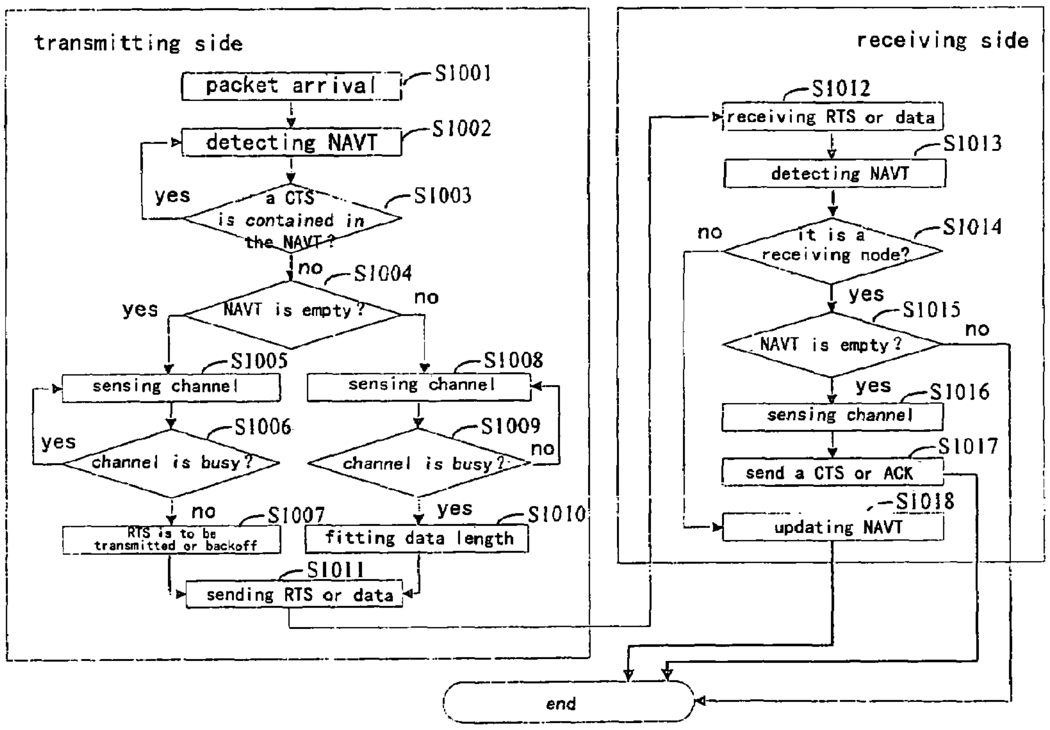
FIG. 10 is a flowing chart illustrating a distributed medium access control method based on the NAVT in a case where it has no split channel.

The flow of the access method based on the NAVT table is described with reference to FIG. 10 and FIG. 11, which show the case where it has no split channel and the case where it has split channel respectively.

Based on whether the wireless channel is split or not, the present invention can use such two modes as channel splitting and no channel splitting. Herein, the mode of no channel splitting involves that all nodes share the radio bandwidth, that is, all packets from the respective nodes, no matter whether control packet or data packet, are transmitted on the shared channel. The method will be described below with reference to FIG. 10.

When a packet arrives at the transmitting node (in step S1001), the packet is stored in the transmitting storage unit 601 to wait for a chance to be transmitted. If the transmitting storage unit 601 is not empty, the transmitting node detects the current status of the NAVT storage timer unit 607 by using the detecting unit 602 (in step S1002), and determines the detected result output from the detecting unit 602 by using the determination unit 603.

Firstly, it is determined whether there is a CTS item in the NAVT table (in step S1003). If a CTS item is present in the packet type field of the NAVT (yes in step S1003), the detection of the NAVT storage timer unit 607 is continued until it meets the above described condition. If no CTS item is present in the packet type field of the NAVT (no in step S1003), that is, the NAVT table is as shown in FIG. 9A and FIG. 9B, the transmitting node will further judge whether the NAVT is empty or not (in step S1004).

If the NAVT is empty (yes in step S1004), that is, the NAVT table is as shown in FIG. 9A, the transmitting node senses channels by using the channel sensing unit 604 (in step S1005). If the channel is not busy (no in step S1006), the RTS packet is immediately transmitted when the channel is idle in the DIFS. Otherwise, a backoff procedure is entered (in step S1007) and the RTS packet is prepared for transmitting after the expiration of the backoff time. If the channel is busy (yes in step S1006), the sensing of channel is continued until the channel becomes idle. If the NAVT is not empty (no in step S1004), that is, the NAVT table is as shown in FIG. 9B, the transmitting node senses the channel by using the channel sensing unit 604 (in step S1008). If the channel is not busy (no in step S1009), the sensing of channel is continued until the channel becomes busy. If the channel is busy (yes in step S1009), a data length fitting is performed (in step S1010) and the RTS or data packet is prepared to be transmitted. The length of the data packet should be fitted to meet the following condition: the time necessary for transmitting the data is equal to the smaller one between the time obtained by the subtraction of two SIFSs and the time for transmitting one RTS and one CTS from the TRTS of the current NAVT, and the time necessary for transmitting the actual data packet.

The transmitting node transmits the RTS packet by using the transmitting unit 606 (in step S1011), the value of its duration field is equal to the sum of the time for transmitting the subsequent data packet or the data packet having the fitted length, plus with the time for transmitting one CTS, one ACK and three SIFSs. The transmitting node can also transmit the data packet having the fitted length directly.

All the nodes around the transmitting node successfully receive the RTS from the transmitting node by using the receiving unit 616 (in step S1012). At this time, the nodes detect their respective NAVT tables by using the detecting unit 615 (in step S1013) and make a determination by using the determination unit 614.

Firstly, it is determined whether the current node is a receiving node or not (in step S1004). If it is a non-receiving node (no in step S1004), the current node updates its NAVT storage timer unit 607 by using the updating unit 612 (in step S1018), that is, compares the duration included in the received RTS with the corresponding duration in the RTS field of the current NAVT and selects the larger one between these two for updating the NAVT. If the current node is a receiving node (yes, step S1014), the current node further determines whether the NAVT is empty or not (in step S1015).

When the NAVT table is as shown in FIG. 9A (yes in step S1015), the receiving node senses the channel by using the channel sensing unit 613 (in step S1016). When the sensed channel is in idle status in SIFS, the CTS packet is transmitted by the transmitting unit 606 (in step S1017).

All the non-transmitting nodes around the receiving node successfully receive the CTS from the receiving node by using the receiving unit 616. AT this time, these non-transmitting nodes update their respective NAVT storage timer unit 607 by using the updating unit 612, that is, compare the duration included in the received CTS with the corresponding duration in the CTS field of the current NAVT and select the larger one between the two for updating.

Figure 11:
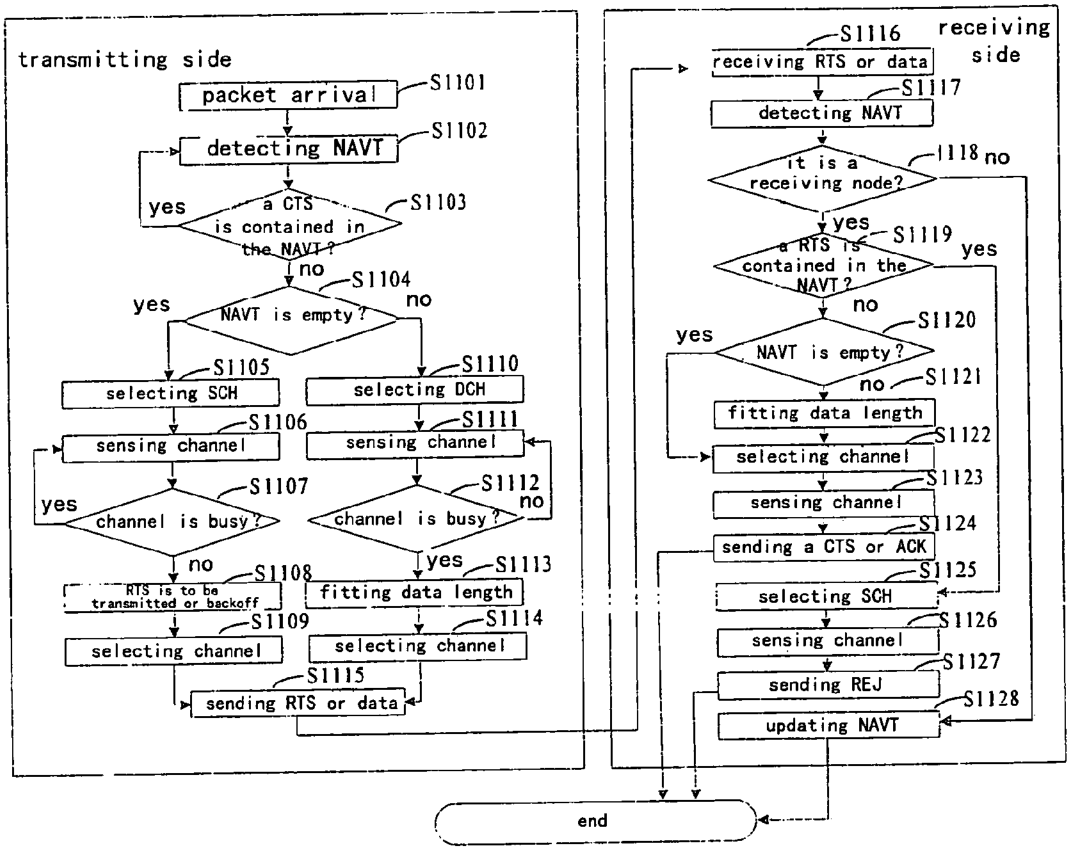
FIG. 11 is a flowing chart illustrating a distributed medium access control method based on the NAVT in a case where it has split channel.

FIG. 11 illustrates the wireless access method based on the NAVT table in the case of channel splitting. The other mode of the present invention is a wireless access mode based on the NAVT table in the case of channel splitting. This mode splits the shared wireless channel into data channel and signaling channel, to thereby not only avoid the collision between a control packet and a data packet, but solve the problem of unnecessary retransmission and improves the utilization ratio of resources. The flow of the method of the present invention in the case of channel splitting will be described below with reference to FIG. 11.

In the case of channel splitting, the shared wireless bandwidth for use in the distributed network is split into two portions: one portion is used for the transmission of control packets such as RTS, CTS, being referred to as signaling channel (SCH); the other portion is used for the transmission of packet such as DATA, being referred to as data channel (DCH). The ratio for splitting is determined by the average load of the system.

When a packet arrives at the transmitting node (in step S1101), the packet is stored in the transmitting storage unit 601 to wait for a chance to be transmitted. If the transmitting storage unit 601 is not empty, the transmitting node detects the current status of the NAVT storage timer unit 607 by using the detecting unit 602 (in step S1102), and determines the detected result output from the detecting unit 602 by using the determination unit 603.

Firstly, it is determined whether there is a CTS item in the NAVT table (in step S1103). If a CTS item is present in the packet type field of the NAVT (yes in step S1103), the detection of the NAVT storage timer unit 607 is continued until it meets the above condition. If no CTS item is present in the packet type field of the NAVT (no in step S1103), that is, the NAVT table is as shown in FIG. 9A and FIG. 9B, the transmitting node will further judge whether the NAVT is empty or not (in step S1104).

If the NAVT is empty (yes in step S1104), that is, the NAVT table is as shown in FIG. 9A, the transmitting node selects the signaling channel by using the channel selecting unit 707 (in step S1105) and senses the SCH by using the channel sensing unit 704 (in step S1106). If the channel is not busy (no, step S107), the RTS packet is immediately transmitted on the SCH when the channel is idle in the DIFS. Otherwise a backoff procedure is entered (in step S1108) and the SCH is selected by the channel selecting unit 708 to prepare for transmitting the RTS packet after the expiration of the backoff time (in step S1109). If the channel is busy (yes in step S1107), the sensing of channel is continued until the channel becomes idle. If the NAVT is not empty (no in step S1104), that is, the NAVT table is as shown in FIG. 9B, the transmitting node selects the data channel (DCH) by using the channel selecting unit 707 (in step S1110), and senses the DCH by using the channel sensing unit 704 (in step S1111). If the channel is not busy (no in step S1112), the sensing of the DCH is continued until the channel becomes busy. If the channel is busy (yes in step S1112), a data length fitting is performed (in step S1113) and the SCH is selected by the channel selecting unit 708 (in step S1114) to prepare for transmitting the RTS or data packet. The length of the data packet should be fitted to meet the following condition: the time necessary for transmitting the data on DCH is equal to the smaller one between the time obtained by the subtraction of two SIFSs and the time for transmitting one RTS and one CTS on the SCH from the TRTS the current NAVT, and the time necessary for transmitting the actual data packet on the DCH.

The transmitting node transmits the RTS packet on the SCH selected by the channel selecting unit 708 by using the transmitting unit 706 (in step S1115), the value of its duration field is equal to the sum of the time for transmitting the subsequent data packet having the fitted length on the DCH, plus with the time for transmitting one CTS, one ACK and three SIFSs. The transmitting node can also transmit the data packet having the fitted length on the DCH selected by the channel selecting unit 708 directly.

All the nodes in the sensing range of the transmitting node successfully receive the RTS from the transmitting node on the channel selected by the channel selecting unit 708 by using the receiving unit 716 (in step S1116). At this time, the nodes detect their respective NAVT tables by using the detecting unit 715 (in step S1117) and make a determination by using the determination unit 714.

Firstly, it is determined whether the current node is a receiving node or not (in step S1118). If it is a non-receiving node (no in step S1118), the current node updates its respective timer unit for NAVT storage 607 by using the updating unit 612 (in step S1128), that is, compares the duration included in the received RTS with the corresponding duration in the RTS field of the current NAVT and selects the larger one between these two for updating the NAVT. If the current node is a receiving node (yes in step S1118), the current node further determines whether the RTS item is present (in step S1119).

If a RTS item is present in the packet type field of the NAVT (yes in step S1119), that is, the NAVT table is as shown in FIG. 9B or FIG. 9D, the transmitting node selects the SCH by using the channel selecting unit 719 (in step S1125). After sensing the SCH for SIFS interval (in step S1126), a REJ packet is transmitted on the SCH (in step S1127). If no CTS item is present in the packet type field of the NAVT (no in step S1119), that is, the NAVT table is as shown in FIG. 9A or FIG. 9C, it is further determined whether the NAVT is empty or not (in step S1120).

If the NAVT is empty (yes in step S1120), that is, the NAVT is as shown in FIG. 9A, the SCH is selected by the channel selecting unit 719 (in step S1122). After sensing the SCH for SIFS interval (in step S1123), the CTS or the acknowledge packet is transmitted on the SCH (in step S1124). If the NAVT is not empty (no in step S1120), that is, the NAVT is as shown in FIG. 9C, the data length is fitted by the data length fitting unit 717 (in step S1121), allowing the fitted data packet length to meet the following condition: the time necessary for transmitting the packet on the DCH is equal to the smaller one among the time obtained by the subtraction of one SIFS and the time for transmitting the CTS on the SCH from the value of the duration field in the received RTS, the TRTS of the current NAVT, and the time necessary for transmitting the actual data packet on the DCH. After the termination of the data length fitting procedure, a channel is selected and sensed to transmit the CTS or the acknowledge packet.

Figure 12A:
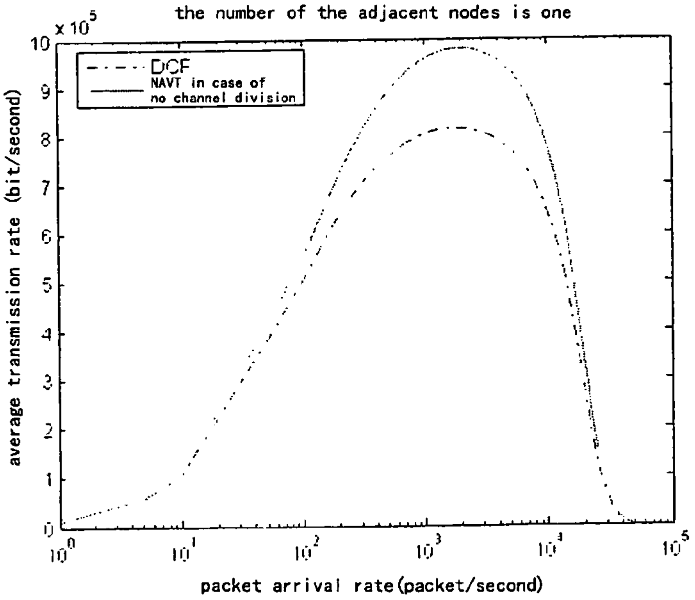
FIGS. 12A and 12B are diagrams illustrating respectively the system throughput performance in the distributed MAC method based on NAVT in the case where it has no split channel and in the case where it has split channel.
Figure 12:
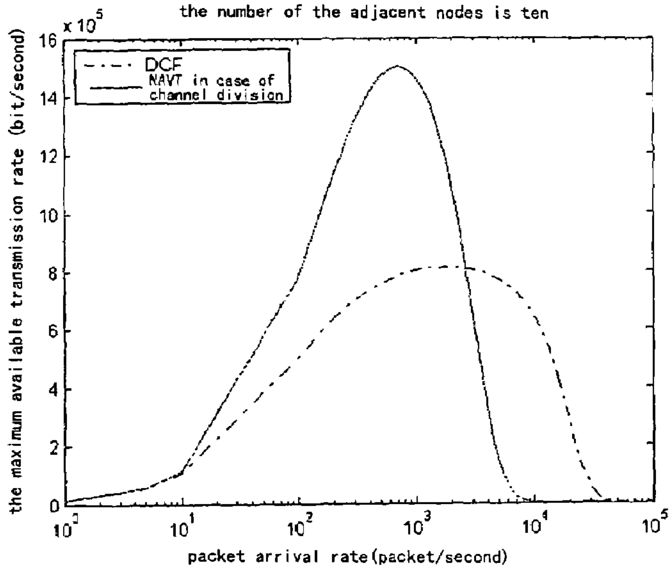

FIG. 12 is a diagram illustrating the system throughput performance in the distributed MAC method based on the NAVT in the case of no channel division and in the case of channel splitting. Herein, FIG. 12A is a diagram illustrating the system throughput performance in the distributed MAC method with RTS/CTS exchange based on the NAVT in the case of no channel splitting, in condition that the number of the adjacent nodes is one; and FIG. 12B is a diagram illustrating the system throughput performance in the distributed MAC method with RTS/CTS exchange based on the NAVT in the case of channel splitting, in condition that the number of the adjacent nodes is ten.

In above distributed medium access control method based on the NAVT in the case of no channel splitting, the exposed terminal being within the communication range of the transmitting node but not within the communication range of the receiving node is permitted to transmit packet, to thereby improve the system throughput and the utilization ratio of resources without influence on the existing transmission. As shown in FIG. 12, the theoretic analysis result shows that the system performance in the range of the nodes A and B is improved by 40% when ten nodes to transmit data are within the communication range of node A.

In above distributed medium access control method based on the NAVT in the case of channel splitting, not only the exposed terminal being within the communication range of the transmitting node but not within the communication range of the receiving node is permitted to transmit packet, but also the node being within the communication range of the receiving node but not within the communication range of the transmitting node is allowed to receive packet and respond to the request for being unable to receive the packet, to thereby reduce the unnecessary retransmission. As shown in FIG. 12, the theoretic analysis result shows that the system performance in the range of the nodes A and B is further improved as compared with that in the case of no channel division when a proper channel division ratio is selected.

According to one embodiment of the present invention, in the auto-organization distributed wireless context in which all the nodes independently distribute, a network allocation vector table (NAVT) is set for each node. When only RTS is present in the NAVT of the transmitting node, that is, indicating that only other nodes are transmitting data around it, the node can transmit packet simultaneously with the nodes being transmitting packet, without making a disturbance on the on-going transmission. In the case of channel splitting, not only the above transmitting node can send data, but also when only CTS is present in the NAVT of the receiving node, that is, indicating only other nodes are receiving data around it, the node can transmit the CTS or REJ packet on the SCH to respond the received RTS, and can receive data with around nodes simultaneously, without making a disturbance on the on-going transmission. As such, not only the system throughput is improved but also the unnecessary retransmission of the transmitting node is reduced when the receiving node cannot correctly receive packet.

The various preferred embodiments of the present invention are described in detail below with reference to the Figures.

The First Embodiment

Figure 13:
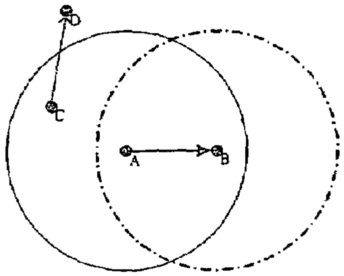
FIG. 13 is a diagram illustrating node distribution in the distributed wireless network according to the first, the second and the third embodiments of the present invention.

FIG. 13 is a diagram illustrating node distribution in the distributed wireless network according to the first, the second and the third embodiments of the present invention. In the FIG. 13, node A and node B are within the communication range of each other; node C is within the communication range of node A but not within the communication range of node B; and node D is not within the communication range of any nodes. Node A is to transmit a packet to node B; and node C is to transmit a packet to node D. The NAVT table is empty when a packet arrives in node A, and the NAVT table in node B is also empty.

Figure 14:
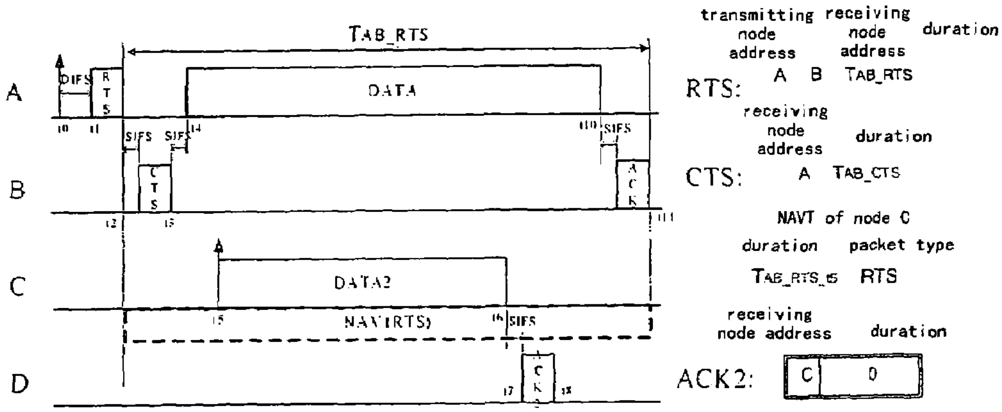
FIG. 14 is a diagram illustrating timing sequence of the access method based on the NAVT without RTS/CTS exchange when node distribution is as shown in FIG. 13 in the case where it has no split channel.

FIG. 14 is a diagram illustrating timing sequence of the access method based on the NAVT without RTS/CTS exchange when node distribution is as shown in FIG. 13 in the case of no channel splitting.

At time to, a packet arrives at the transmitting storage unit 601 in node A. Node A detects that the packet arrives and the current NAVT is empty by using the detecting unit 602, and sends the result to the channel sensing unit 604 via the determination unit 603 for sensing channel. When it is sensed that the channel is idle in the DIFS interval, the RTS packet is started to send by the transmitting unit 606 at time t1. The description of the partial fields in the RTS packet transmitted by node A is shown in the first line on the right side of FIG. 14, wherein the value of the duration field is $T_{AB\_RTS}$.

At time t2, node B receives the RTS from node A by using the receiving unit 616. The detecting unit 615 detects that the RTS packet is successfully received, and this packet is stored into the receiving storage unit 611. Since it is detected that the current node is a receiving node and the current NAVT is empty, the result is sent to the channel sensing unit 613 via the determination unit 614, and the CTS packet is transmitted by the transmitting unit 606 in node B after the SIFS time. The description of the partial fields in the CTS packet transmitted by node B is shown in the second line on the right side of FIG. 14, wherein the value of the duration field is $T_{AB\_CTS}$. The $T_{AB\_CTS}$ is equal to ($T_{AB\_RTS}$-SIFS-$T_{CTS}$), wherein $T_{CTS}$ is the time necessary for transmitting the CTS packet.

At time t2, node C receives the RTS from node A by using the receiving unit 616. The detecting unit 615 detects that the RTS packet is successfully received, and this packet is stored into the receiving storage unit 611. Since it is detected that the current node is a non-receiving node, the updating unit 612 is entered via the determination unit 614, and the updating unit 612 updates the RTS item in current NAVT by comparing the RTS packet in the receiving storage unit 611 with the value in the NAVT storage timer unit 607.

At time t3, node A receives the CTS from node B by using the receiving unit 616. The detecting unit 615 detects that the CTS packet is successfully received, and this packet is stored into the receiving storage unit 611 in node A. Since it is detected that the current node is a receiving node for the CTS packet, the channel sensing unit 613 is entered via the determination unit 614, and after a SIFS, the DATA packet is transmitted by the transmitting unit 606 at time t4.

At time t5, a packet arrives in node C. At this time, node C detects that the packet arrives by using the detecting unit 602, and further detects that only RTS item is indicated in its NAVT. The NAVT of node C at time t5 is shown in the third line on the right side of FIG. 14, wherein $T_{AB\_RTS\_t5}$ indicates the value at time t5 under the control of the NAVT storage timer unit 607. Node C transmits the result from the determination unit 603 into the channel sensing unit 604, performs a data length fitting upon sensing that the channel is busy, and transmits data packet DATA2 by using the transmitting unit 606 based on the fitted data length.

At time t6, node D receives the DATA2 packet from node C by using the receiving unit 616, and stores the packet in the receiving storage unit 611. The node D detects that the packet is correctly received and the node is a receiving node. Moreover, node D detects that its NAVT is empty. And then the channel sensing unit 613 is entered via the determination unit 614, and the ACK2 packet is transmitted by the transmitting unit 606 after the SIFS interval. The description of the fields in the ACK2 packet transmitted by node D is shown in the fifth line on the right side of FIG. 14.

Node C receives the data from the receiving unit 616, and detects that the data collision occurs during the time interval from t7 to t8. As such, it is assumed that the ACK2 packet is correctly received, and then the operations are terminated.

At time t10, node B receives the DATA packet from node A by using the receiving unit 616. The detecting unit 615 detects that the packet is correctly received and the current node is a receiving node, and this packet is stored into the receiving storage unit 611. And the determination result from the determination unit 614 is transmitted into the channel sensing unit 613, and the ACK packet is transmitted by the transmitting unit 606 after the SIFS interval.

At time t11, node A receives the ACK packet from node B by using the receiving unit 616. The detecting unit 615 detects that the packet is correctly received. And then the operations are terminated.

In the present embodiment, although the NAVT from the RTS is set at node C and it is sensed that the channel is busy, it is still allowed to transmit the packet. As long as the NAVT table at node D is empty, that is, no other nodes around node D are transmitting/receiving data, nodes C and D can perform the transmission for the packet with the nodes A and B simultaneously, without influence on the transmission and reception of the packets of each other.

The Second Embodiment

Figure 15:
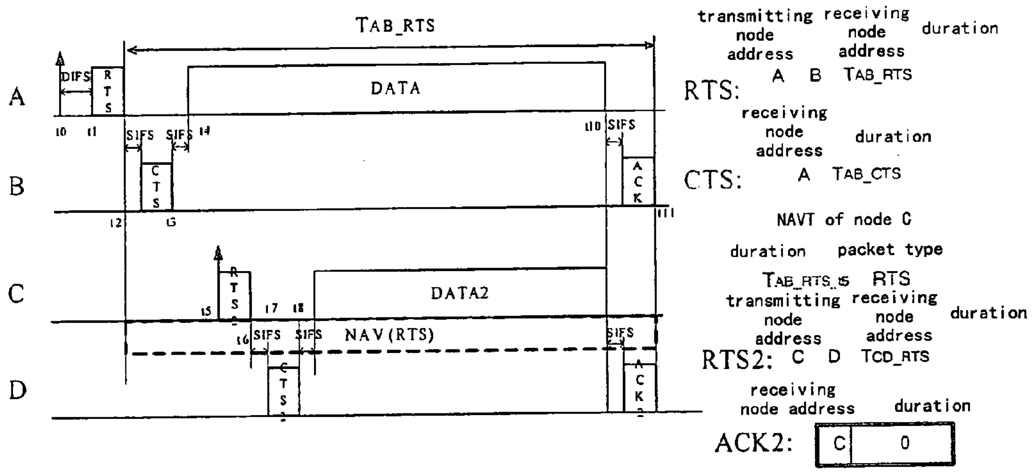
FIG. 15 is a diagram illustrating timing sequence of the access method based on the NAVT with RTS/CTS exchange when node distribution is as shown in FIG. 13, in the case where it has no split channel.

FIG. 15 is a diagram illustrating timing sequence of the access method based on the NAVT with RTS/CTS exchange when the node distribution is as shown in FIG. 13 in the case of no channel splitting.

In the present embodiment, the operations concerning nodes A and B are the same as those in the first embodiment, the description of which is omitted herein.

At time t5, a packet arrives in node C. At this time, node C detects the arrival of packet by using the detecting unit 602, and further detects that only RTS item is indicated in its NAVT. The NAVT of node C at time t5 is shown in the third line on the right side of FIG. 15, wherein $T_{AB\_RTS\_t5}$ indicates the value at time t5 under the control of the NAVT storage timer unit 607. Node C enters the channel sensing unit 604 via the determination unit 603, performs a data length fitting upon sensing that the channel is busy, and transmits the RTS2 packet by using the transmitting unit 606 based on the fitted data length. The description of the partial fields in the RTS2 is shown on the fourth line in FIG. 15, wherein the value of the duration field is $T_{CD\_RTS}$, indicating the time necessary for performing the transmission of the subsequent data packet having the fitted length.

At time t6, node D receives the RTS2 packet from node C by using the receiving unit 616, and stores the packet in the receiving storage unit 611. The node D detects that the packet is correctly received and the node is a receiving node. Moreover, node D detects that its NAVT is empty. And then the channel sensing unit 613 is entered via the determination unit 614, and the CTS2 packet is transmitted by the transmitting unit 606 after the SIFS interval.

Node C receives the data from the receiving unit 616, and detects that the data collision occurs during the time interval from t7 to t8. At time t8, the collision is terminated, the determination result is transmitted to the channel sensing unit 613. After waiting for SIFS, the data packet DATA2 having a length specified by the data length fitting unit 605 is to be transmitted.

At time t10, node D receives the DATA2 packet from node C by using the receiving unit 616. The detecting unit 615 detects that the packet is correctly received. This DATA2 packet is stored into the receiving storage unit 611. And the result from the determination unit 614 is transmitted into the channel sensing unit 613 for sensing the channel, and then the ACK2 packet is transmitted after the SIFS interval. The description of the fields in the ACK2 packet transmitted by node D is shown in the fifth line on the right side of FIG. 15.

At time t11, node C receives the ACK2 packet from node D by using the receiving unit 616. The detecting unit 615 detects that the packet is correctly received. And then the operations are terminated.

In the present embodiment, although a RTS item is contained in the NAVT at node C and it is sensed that the channel is busy, it is still allowed to transmit the packet. As long as the NAVT table at node D is empty, that is, no other nodes around node D are transmitting/receiving data, nodes C and D can perform the transmission for the packet with the nodes A and B simultaneously, without influence on the transmission and reception of the existing packets. As compared with the first embodiment, since the RTS/CTS handshaking procedure is added before the transmission of the data packet, the performance loss due to collision of the data packet directly transmitted is reduced in the case of a long data packet.

The Third Embodiment

Figure 16:
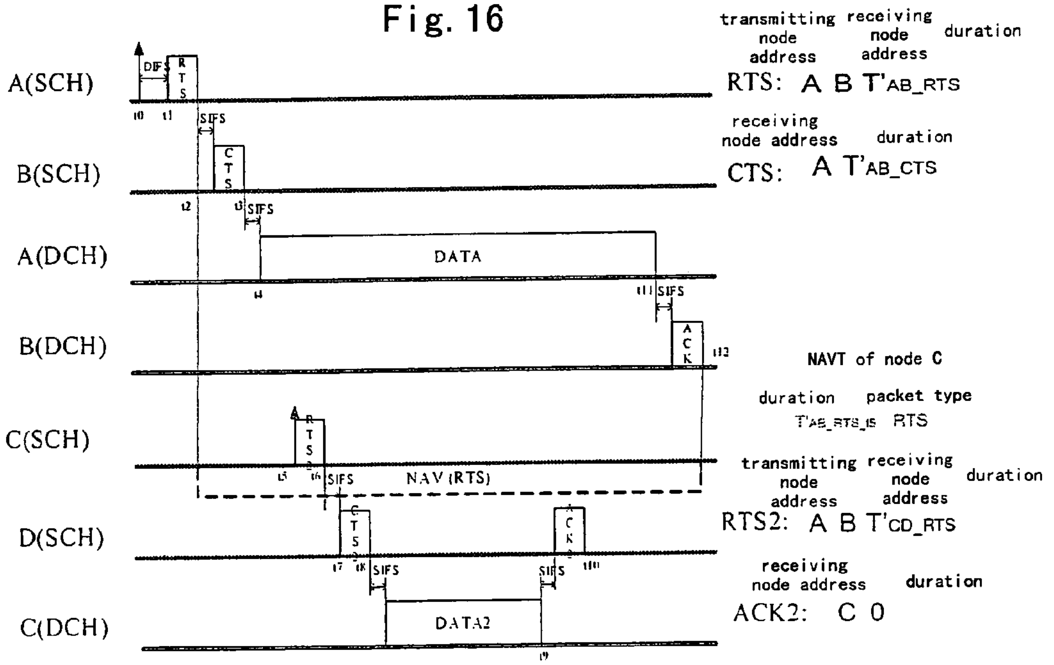
FIG. 16 is a diagram illustrating timing sequence of the access method based on the NAVT with RTS/CTS exchange when node distribution is as shown in FIG. 13 in the case where it has split channels.

FIG. 16 is a diagram illustrating timing sequence of the access method based on the NAVT with RTS/CTS exchange when node distribution is as shown in FIG. 13 in the case of channel splitting.

At time t0, a packet arrives at the transmitting storage unit 601 in node A. Node A detects that the packet arrives and the current NAVT is empty by using the detecting unit 602, and sends the determination result from the determination unit 603 into the channel selecting unit 707 to select the SCH. The SCH channel is sensed by the channel sensing unit 704. When it is sensed that the SCH channel is idle in the DIFS interval, the SCH channel is maintained by the channel selecting unit 708, and the RTS packet is started to send on the SCH by the transmitting unit 706 at time t1. The description of the partial fields in the RTS packet transmitted by node A is shown in the first line on the right side of FIG. 16, wherein the value of the duration field is $T_{AB\_RTS}$, indicating the time necessary for transmitting the subsequent packet in the case of channel splitting.

At time t2, node B receives the RTS from node A on the SCH defaulted by the channel selecting unit 718 by using the receiving unit 716. The detecting unit 715 detects that the RTS packet is successfully received, and this packet is stored into the receiving storage unit 611. Since it is detected that the current node is a receiving node and the current NAVT is empty, the result is sent to the channel selecting unit 719 via the determination unit 714 to select the SCH. And the CTS packet is transmitted on the SCH by the transmitting unit 706 in node B after the channel sensing unit 713 senses the SCH for the SIFS interval. And then the channel selecting unit 718 in the receiving device is instructed to select the DCH to prepare for receiving the data packet. The description of the partial fields in the CTS packet transmitted by node B is shown in the second line on the right side of FIG. 16, wherein the value of the duration field is $T'_{AB\_CTS}$. The $T'_{AB\_CTS}$ is equal to ($T'_{AB\_RTS}$-SIFS-$T'_{CTS}$), wherein $T'_{CTS}$ is the time necessary for transmitting the CTS packet on the SCH.

At time t2, node C receives the RTS from node A on the SCH defaulted by the channel selecting unit 718 by using the receiving unit 716. The detecting unit 715 detects that the RTS packet is successfully received, and this packet is stored into the receiving storage unit 611. Since it is detected that the current node is a non-receiving node, the updating unit 612 is entered via the determination unit 714, and the updating unit 612 updates the item RTS in the current NAVT by comparing the RTS packet in the receiving storage unit 611 with the value in the timer unit for NAVT storage 607.

At time t3, node A receives the CTS from node B on the SCH defaulted by the channel selecting unit 718 by using the receiving unit 716. The detecting unit 715 detects that the CTS packet is successfully received, and this packet is stored into the receiving storage unit 611 in node A. Since it is detected that the current node is a receiving node for the CTS packet, the result is transmitted to the channel selecting unit 719 via the determination unit 714 to select the DCH, and the DATA packet is transmitted on the DCH by the transmitting unit 706 at time t4 after the channel sensing unit 713 senses the DCH for SIFS time. Ant then the channel selecting unit 718 in the receiving device is instructed to select the DCH to prepare for receiving the acknowledge packet.

At time t5, a packet arrives in node C. At this time, node C detects the arrival of the packet arrives by using the detecting unit 602, and further detects that only RTS item is indicated in its NAVT. The NAVT of node C at time t5 is shown in the fifth line on the right side of FIG. 16, wherein $T'_{AB\_RTS\_t5}$ indicates the value at time t5 under the control of the NAVT storage timer unit 607. Node C selects the DCH by using the channel selecting unit 707 based on the result from the determination unit 603, performs a data length fitting upon sensing by the channel sensing unit 704 that the DCH is busy, and transmits RTS2 packet on the SCH selected by the channel selecting unit 708 by using the transmitting unit 706 based on the fitted data length. The description of the partial fields in the RTS2 is shown on the sixth line in FIG. 16, wherein the value of the duration field is $T'_{CD\_RTS}$ indicating the time necessary for transmitting the data packet having the fitted length in the case of channel splitting.

At time t6, node D receives the RTS2 packet from node C on the SCH defaulted by the channel selecting unit 718 by using the receiving unit 716, and stores the packet in the receiving storage unit 611. The node D detects that the packet is correctly received and the current node is a receiving node. Moreover, node D detects that its NAVT is empty. And then the channel selecting unit 719 is entered via the determination unit 714, and the CTS2 packet is transmitted on the SCH by the transmitting unit 706 at t7 after the channel sensing unit 713 senses the SCH for the SIFS interval. And then the channel selecting unit 718 in the receiving device is instructed to select the DCH to prepare for receiving the data packet.

At time t8, node C receives the CTS2 packet from node D on the SCH defaulted by the channel selecting unit 718 by using the receiving unit 716. After the detecting unit 715 detects that the packet is correctly received, the channel selecting unit 719 is entered via the determination unit 714 to select the DCH. The DATA2 packet is transmitted on the DCH by the transmitting unit 706, after the channel sensing unit 713 senses the SCH for the SIFS interval. And then the channel selecting unit 718 in the receiving device is instructed to select the SCH to prepare for receiving the acknowledge packet.

At time t9, node D receives the DATA2 packet from node C on the DCH indicated by the channel selecting unit 718 by using the receiving unit 716. The detecting unit 715 detects that the packet is correctly received, and the DATA2 packet is stored in the receiving storage unit 611. The result is transmitted to the channel sensing unit via the determination unit 714 to select the SCH, and the ACK2 packet is transmitted after the channel sensing unit 713 senses the SCH for the SIFS interval. The description of the fields in the ACK2 packet transmitted by node D is shown in the seventh line on the right side of FIG. 16.

At time t10, node C receives the ACK2 packet from node C on the SCH indicated by the channel selecting unit 718 by using the receiving unit 716. The detecting unit 715 detects that the packet is correctly received. And then the operations are terminated.

At time t11, node B receives the DATA packet from node A on the DCH indicated by the channel selecting unit 718 by using the receiving unit 716. The detecting unit 715 detects that the packet is correctly received and the current node is a receiving node. And then the packet is stored in the receiving storage unit 611. The determination result from the determination unit 714 is transmitted to the channel selecting unit 719 to select the DCH. The ACK packet is transmitted on the DCH by the transmitting unit 706 after the channel sensing unit 713 senses the DCH for the SIFS interval.

At time t12, node A receives the ACK packet from node B on the DCH indicated by the channel selecting unit 718, by using the receiving unit 716. The detecting unit 715 detects that the packet is correctly received. And then the operations are terminated.

In the present embodiment, although the NAVT from the RTS is set at node C and it is sensed that the channel is busy, it is still allowed to transmit the packet. Since the NAVT table is not set at node D, that is, no other nodes around node D are transmitting/receiving data, nodes C and D can perform the transmission for the packet with the nodes A and B simultaneously, without influence on the transmission and reception of the existing packets. Although a channel is split, the operation in the present embodiment is substantially similar to that in the first embodiment in the case of the node distribution as shown in FIG. 13, but in the present embodiment, RTS, CTS and ACK are transmitted on the SCH and DATA packet is transmitted on the DCH.

The Fourth Embodiment

Figure 17:
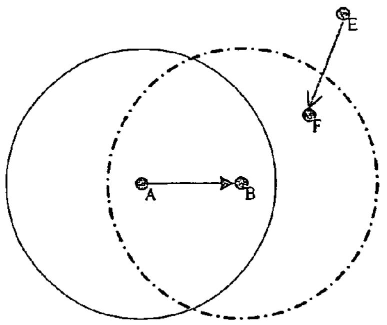
FIG. 17 is a diagram illustrating node distribution in the distributed wireless network according to the fourth embodiment of the present invention.

FIG. 17 is a diagram illustrating node distribution in the distributed wireless network according to the fourth embodiment of the present invention. In the FIG. 17, node A and node B are within the communication range of each other; node F is within the communication range of node B but not within the communication range of node A; and node E is not within the communication range of any nodes. Node A is to transmit a packet to node B; and node E is to transmit a packet to node F. The NAVT table is empty when a packet arrives in node A, and the NAVT table in node B is also empty.

Figure 18:
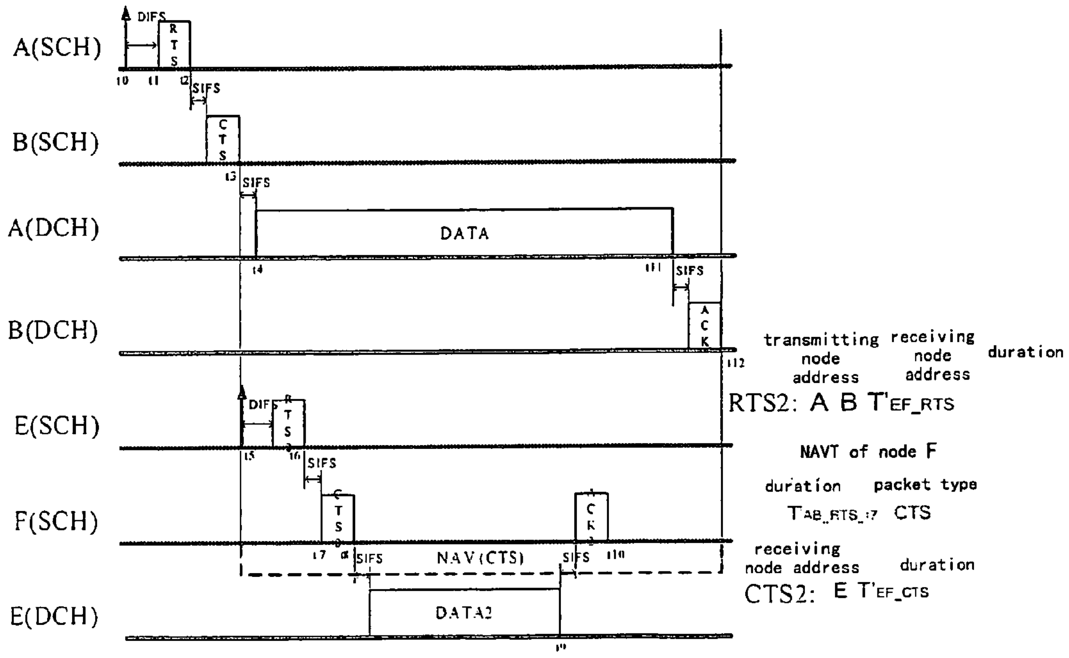
FIG. 18 is a diagram illustrating timing sequence of the access method based on the NAVT with RTS/CTS exchange when node distribution is as shown in FIG. 17 in the case where has split channels splitting.

FIG. 18 is a diagram illustrating timing sequence of the access method based on the NAVT with RTS/CTS exchange when node distribution is as shown in FIG. 17 in the case of channel splitting.

In the present embodiment, all operations concerning nodes A and B are the same as those in the third embodiment, the description of which is omitted herein.

At time t3, node F receives the CTS from node B on the SCH defaulted by the channel selecting unit 718 by using the receiving unit 716. The detecting unit 715 detects that the CTS packet is successfully received, and this packet is stored into the receiving storage unit 611. Since it is detected that the current node is a non-receiving node, the updating unit 612 is entered via the determination unit 714, and the updating unit 612 updates the item CTS in the current NAVT by comparing the CTS packet in the receiving storage unit 611 with the value in the NAVT storage timer unit 607.

At time t5, a packet arrives at the transmitting storage unit 601 in node E. At this time, node E detects that the packet arrives by using the detecting unit 602 and the current NAVT is empty. The result is transmitted to the channel selecting unit 707 via the determination unit 603 to select the SCH. The RTS2 packet is to be transmitted when the channel sensing unit 704 senses the signaling channel is idle in the DIFS time. The description of the partial fields in the RTS2 transmitted by node E is shown on the fifth line in FIG. 18, wherein the value of the duration field is $T'_{EF\_RTS}$.

At time t6, node F receives the RTS2 packet from node E on the SCH defaulted by the channel selecting unit 718 by using the receiving unit 716. The detecting unit 715 detects that the RTS2 packet is successfully received, and the packet is stored in the receiving storage unit 611. Since it is detected that the current node is a receiving node and only CTS item is indicated in its current NAVT, the result is transmitted into the data length fitting unit 717 via the determination unit 714, and the data length fitting unit 717 performs a data length fitting by comparing the item corresponding to CTS in the current the NAVT storage timer unit 607 with the value stored in the receiving storage unit 611. The SCH is selected by the channel selecting unit 719 based on the fitted data length. The CTS2 packet is transmitted on the SCH by the transmitting unit 706 when the SCH is sensed for the SIFS interval, and the channel selecting unit 718 in the receiving device is instructed to select the DCH to prepare for receiving the data packet. The NAVT of node F at time t7 is shown in the sixth line on the right side of FIG. 18, wherein $T'_{AB\_RTS\_t7}$ indicates the value at time t7 under the control of the NAVT storage timer unit 607. The description of the partial fields in the CTS2 transmitted by node F is shown in the seventh line on the right side of FIG. 18, wherein $T'_{EF\_CTS}$ indicates the time necessary for performing the transmission of the data packet having the length specified by the data length fitting unit 717 in the case of channel splitting.

At time t8, node E receives the CTS2 packet from node F on the SCH defaulted by the channel selecting unit 718 by using the receiving unit 716. The channel selecting unit 719 is entered via the determination unit 714 to select the DCH. The DATA2 packet is transmitted on the DCH by the transmitting unit 706 after the channel sensing unit 713 senses the SCH for the SIFS interval.

At time t9, node F receives the DATA2 packet from node E on the DCH indicated by the channel selecting unit 718 by using the receiving unit 716. The detecting unit 715 detects that the packet is correctly received, and the DATA2 packet is stored in the receiving storage unit 611. The result is transmitted to the channel sensing unit via the determination unit 714 to select the SCH, and the ACK2 packet is transmitted after the channel sensing unit 713 senses the SCH for the SIFS interval. And the channel selecting unit 718 in the receiving device selects the SCH to prepare for receiving the acknowledge packet.

At time t10, node E receives the ACK2 packet from node F on the SCH indicated by the channel selecting unit 718 by using the receiving unit 616. The detecting unit 715 detects that the packet is correctly received. And then the operations are terminated.

In the present embodiment, although the NAVT from the CTS is set at node F, the packet transmission with node E is preformed with the packet transmission by nodes A and B simultaneously. Since the channel is split and thus CTS and DATA are transmitted on different channels, the CTS from node F will not cause any influence on the DATA packet transmitted from node A to node B, to thereby allow other nodes around a certain receiving node to receive the packet simultaneously, and improve the system throughput and the utilization ratio of resources.

The Fifth Embodiment

Figure 19:
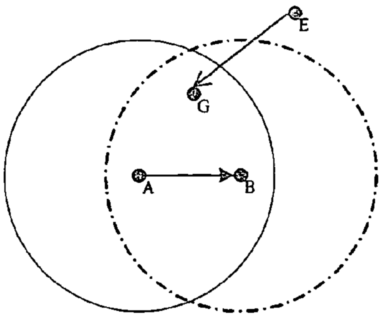
FIG. 19 is a diagram illustrating node distribution in the distributed wireless network according to the fifth embodiment of the present invention.

FIG. 19 is a diagram illustrating node distribution in the distributed wireless network according to the fifth embodiment of the present invention. In the FIG. 19, node A and node B are within the communication range of each other; node G is within the communication range of both node A and node B; and node E is not within the communication range of any nodes. Node A is to transmit a packet to node B; and node E is to transmit a packet to node G. The NAVT table is empty when a packet arrives in node A, and the NAVT table in node B is also empty.

Figure 20:
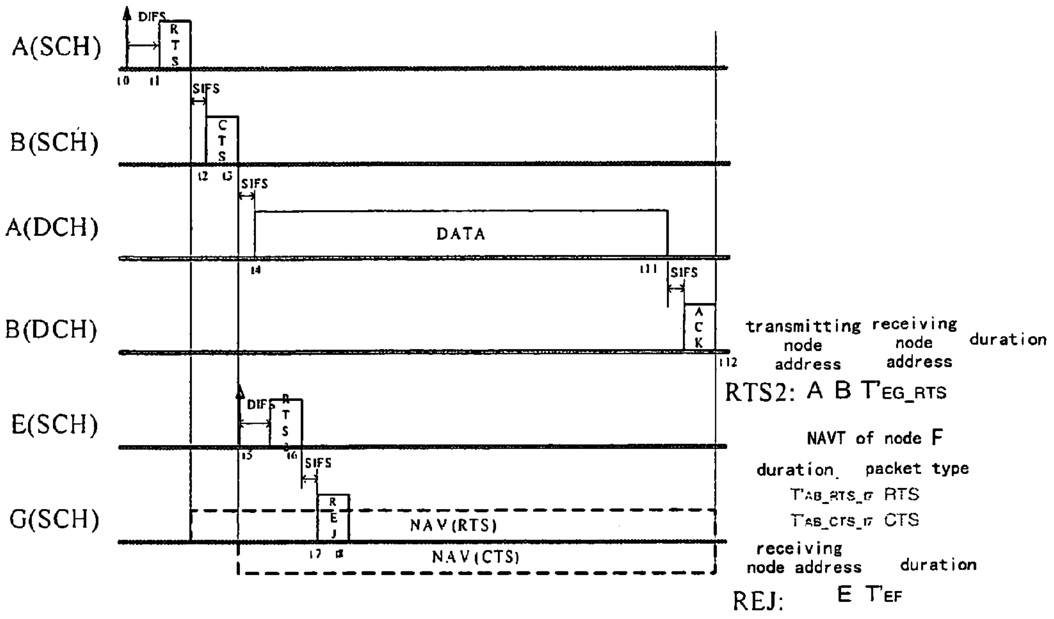
FIG. 20 is a diagram illustrating timing sequence of the access method based on the NAVT with RTS/CTS exchange when node distribution is as shown in FIG. 19 in the case where it has split channels.

FIG. 20 is a diagram illustrating timing sequence of the access method based on the NAVT with RTS/CTS exchange when node distribution is as shown in FIG. 19 in the case of channel splitting.

In the present embodiment, all operations concerning nodes A and B and the operation for transmitting RTS2 packet by node E are the same as those in the fourth embodiment, the description of which is omitted herein.

The description of the partial fields in the RTS2 packet transmitted by node E is shown in the fifth line on the right side of FIG. 20, wherein the value of the duration field is $T'_{EG\_RTS}$.

At time t6, node G receives the RTS2 packet from node E on the SCH defaulted by the channel selecting unit 718 by using the receiving unit 716. The detecting unit 715 detects that the RTS2 packet is successfully received, and the packet is stored in the receiving storage unit 611. Since it is detected that the current node is a receiving node and both RTS item and CTS item are indicated in the current NAVT, the determination unit 714 determines that the current node can neither transmit data nor receive data. Therefore, the determination result is transmitted to the receiving storage unit 611 to delete the received RTS2 packet, and the channel selecting unit 719 is instructed to select the SCH. The REJ packet is transmitted on SCH by the transmitting unit 706 at time t7 after the channel sensing unit 713 senses the signaling channel for SIFS interval. The NAVT of node G at time t7 is shown in the sixth line on the right side of FIG. 20, wherein $T'_{AB\_RTS\_t7}$ indicates the current value of the duration in the RTS packet received by node G under the control of the NAVT storage timer unit 607, and $T_{AB\_CTS\_t7}$ indicates the current value of the duration in the CTS packet received by node G under the control of the NAVT storage timer unit 607. The description of the partial fields in the REJ packet transmitted at time t7 is shown in the seventh line on the right side of FIG. 20, wherein $T'_{EF}$ indicates the maximum of the duration in the current NAVT of node G, that is, the largest one among $T'_{AB\_RTS\_t7}$ and $T'_{AB\_CTS\_t7}$.

At time t8, node E receives the REJ packet from node G on the SCH defaulted by the channel selecting unit 718 by using the receiving unit 716. The detecting unit 715 detects that the packet is correctly received. And then node E will retransmit the packet again after the time $T'_{EF}$.

In the current embodiment, both RTS item and CTS item are contained in the NAVT of node G, indicating both the node being transmitting data and the node being receiving data are present around the node G. However, in the case of channel splitting, the node G can still inform the ambient nodes for requesting to send packet of the current NAVT condition by transmitting REJ packet on the SCH, to thereby allow the node E to avoid transmitting the RTS information repeatedly.

The Sixth Embodiment

Figure 21:
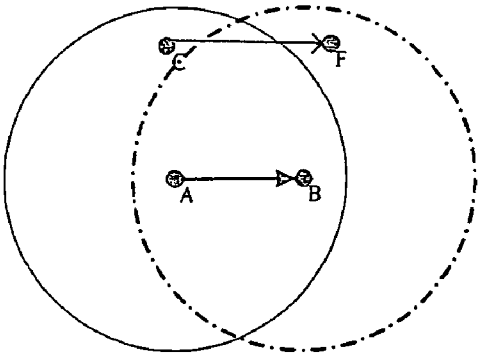
FIG. 21 is a diagram illustrating node distribution in the distributed wireless network according to the sixth embodiment of the present invention.

FIG. 21 is a diagram illustrating node distribution in the distributed wireless network according to the sixth embodiment of the present invention. In the FIG. 21, node A and node B are within the communication range of each other; node C is within the communication range of node A but not within the communication range of node B; and node F is within the communication range of node B but not within the communication range of node A. Node A is to transmit a packet to node B; and node E is to transmit a packet to node G. The NAVT table is empty when a packet arrives in node A, and the NAVT table in node B is also empty.

Figure 22:
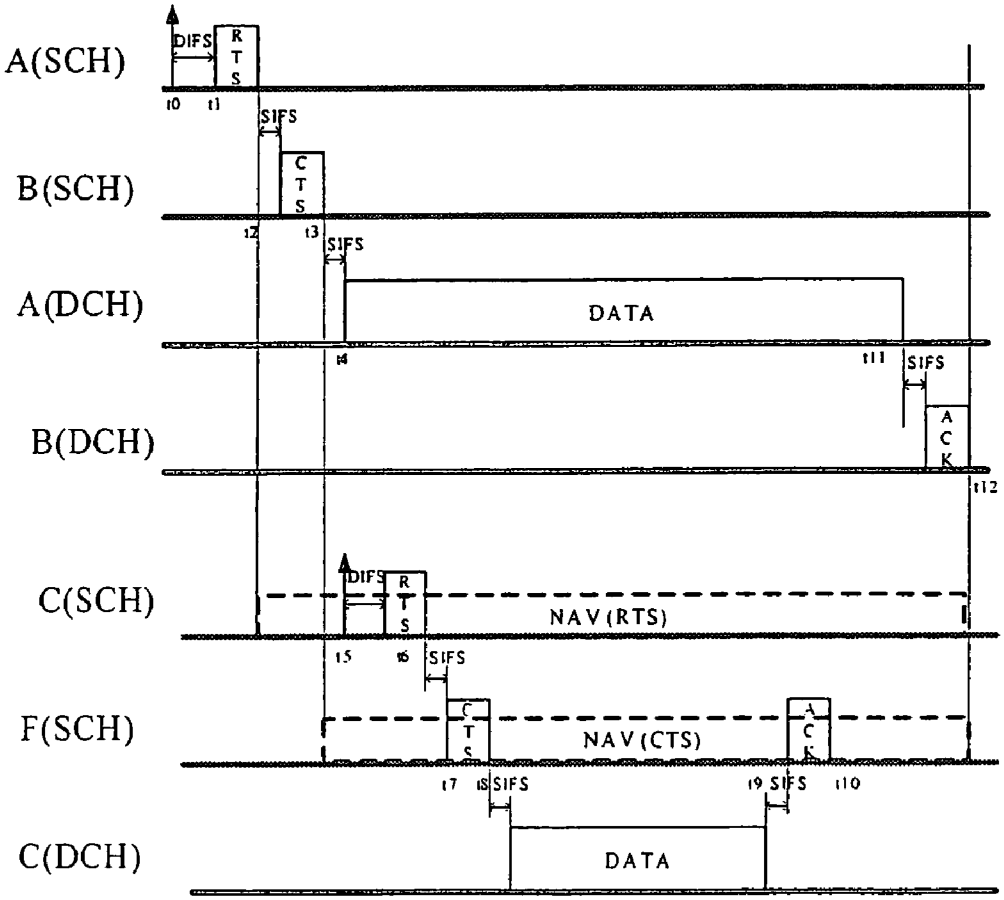
FIG. 22 is a diagram illustrating timing sequence of the access method based on the NAVT with RTS/CTS exchange when node distribution is as shown in FIG. 21 in the case where it has split channels.

FIG. 22 is a diagram illustrating timing sequence of the access method based on the NAVT with RTS/CTS exchange when node distribution is as shown in FIG. 21 in the case of channel splitting.

In the present embodiment, all operations concerning nodes A, B and C are the same as those in the third embodiment, and the operations of node F are the same as those in the fourth embodiment, the description of which is omitted herein.

In the present embodiment, although both other nodes being transmitting data and other nodes being receiving data are present around the node F. However, in the case of channel splitting, the transmission for the RTS packet and the CTS packet will not cause any influence on the transmission between node A and node B, and node C can transmit the data packet to node F on the DCH simultaneously, to thereby improve the system throughput and utilize the system resource more efficiently.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A wireless access method based on Network allocation vector table (NAVT), which is applied to a distributed wireless mobile communication system comprising a plurality of nodes, the NAVT comprises a packet type field indicating whether a packet comes from a transmitting node or from a receiving node and a duration field indicating an expected length of a data transmission and is stored in the respective nodes of the communication system, comprising:

on a transmitting side, determining whether only a request to send (RTS) item indicating that a packet comes from a transmitting node is contained in the NAVT when a packet to be transmitted by the transmitting side arrives;

sensing a channel to determine whether the channel is busy after determining that only the RTS item is contained in the NAVT;

fitting a data length of the packet to be transmitted by the transmitting side to a length shorter than a length of a data transmission obtained by subtracting a predetermined value from the value indicated by the RTS item when it is determined that the channel is busy;

sending a RTS packet including the fitted data length of the packet to be transmitted by the transmitting side, or a data packet with fitted data length; and on a receiving side, determining the contents of the NAVT is empty when the RTS packet is received; and sending a clear to send (CTS) packet back to the transmitting side based on a determination of the contents of the NAVT.

2. The method as claimed in claim 1 using no channel splitting, wherein on a receiving side, determining the contents of the NAVT comprises determining whether the NAVT is empty or not when the RTS packet is received; and wherein sending the RTS packet comprises sending the clear to send packet back to the transmitting side after determining that the NAVT is empty.

3. The method as claimed in claim 2, wherein on the transmitting side, further comprising:

continued sensing of the channel after determining that the channel is idle.

4. The method as claimed in claim 2, wherein on the transmitting side, further comprising:

sensing a channel to determine whether the channel is busy or not after determining that the NAVT is empty; and sending the RTS packet after the channel is idle for the duration of the distributed coordination function interframe space (DIFS) period, otherwise, entering a backoff procedure, and sending the RTS packet after the termination of the backoff procedure.

5. The method as claimed in claim 2, wherein on the receiving side, further comprising:

terminating operation after determining that the NAVT is not empty.

6. The method as claimed in claim 1 using channel splitting, wherein on transmitting side, sensing the RTS packet comprises sensing a data channel (DCH), to determine whether the DCH is busy when only the RTS item is contained in the NAVT, and comprises sending the RTS packet on a signaling channel (SCH) to the receiving side after determining that the DCH is busy;

on receiving side, determining the contents of the NAVT comprises determining whether only a CTS item indicating that a packet comes from a receiving node is contained in the NAVT when the RTS packet is received;

and further comprising prior to the step of sending fitting a data length, when only the CTS item is contained in the NAVT or the NATV is empty.

7. The method as claimed in claim 2 or 6, wherein the NAVT is a two-dimension data table, wherein the packet type field indicates packet types including a RTS item and a CTS item, and the duration field indicates the duration time for CTS item and the RTS item.

8. The method as claimed in claim 2 or 6, wherein when the value of the duration field is reduced to zero, the RTS item or the CTS item in the NAVT corresponding to this duration is emptied.

9. The method as claimed in claim 6, wherein on the transmitting side, further comprising:

sensing the SCH to determine whether the SCH is busy or not after determining that the NAVT is empty; and sending a RTS packet on the SCH after the SCH is idle for the duration of the DIFS period, otherwise, entering a backoff procedure, and sending a RTS packet after the termination of the backoff procedure.

10. The method as claimed in claim 6, wherein on the receiving side, further comprising:

sending on the SCH a Reject (REJ) packet indicating the rejection of a response to the packet transmitted by the transmitting side during the time indicated by the duration field of the REJ packet, wherein the value of the duration field is equal to the subtraction of the time necessary for transmitting the REJ packet on the SCH from the duration of the CTS item in the NAVT after determining that a RTS item is contained in NAVT.

11. The method as claimed in claim 6, wherein on the receiving side, further comprising:

transmitting a CTS packet on the SCH when the NAVT is empty.

12. The method as claimed in claim 2 or 6, wherein on the receiving side, further comprising:

updating the NAVT by a non-receiving node when it receives the RTS packet.

13. The method as claimed in claim 12, wherein updating by a non-receiving node comprises the steps of:

determining whether a RTS item is contained in the NAVT;

adding a RTS item in the NAVT, and duplicating the duration in the received RTS packet into the duration field of the RTS item in the NAVT when no RTS item is contained in the NAVT; and selecting the larger one between the duration in the received RTS packet and the duration of the RTS item stored in the NAVT to update the duration of the RTS item in the NAVT when a RTS item is contained in the NAVT.

14. The method as claimed in claim 2 or 6, wherein further comprising:

updating the NAVT by a non-transmitting node when it receives a CTS packet after the CTS packet is sent back to the transmitting side.

15. The method as claimed in claim 14, wherein updating by the non-transmitting node comprises:

determining whether a CTS item is contained in the NAVT;

adding a CTS item in the NAVT and duplicating the duration included in the received CTS packet into the duration field of the CTS item in the NAVT when no CTS item is contained in the NAVT; and selecting the larger one between the duration in the received CTS packet and the duration of the CTS item stored in the NAVT to update the duration of the CTS item in the NAVT when a CTS item is contained in the NAVT.

16. A node in a distributed wireless mobile communication system comprising a plurality of nodes, comprising:

a Network allocation vector table (NAVT) storage timer unit to store a NAVT comprising a packet type field indicating whether a packet comes from a transmitting node or from a receiving node and a duration field indicating an expected length of a data transmission;

a transmitting device to determine whether only a request to send (RTS) item indicating that a packet comes from a transmitting node is contained in the NAVT when a packet to be transmitted by the transmitting device arrives; sensing channel to determine whether the channel is busy after determining that only the RTS item is contained in the NAVT; fitting a data length of the packet to be transmitted by the transmitting device to a length shorter than a length of a data transmission obtained by subtracting a predetermined value from the value indicating by the RTS item when it is determined that the channel is busy; and sending a RTS packet including the fitted data length of the packet to be transmitted by the transmitting device, or data packet with fitted data length; and a receiving device to determine the contents of the NAVT when the RTS packet is received; and sending clear to send (CTS) packet back to the transmitting side on the basis of the determination of the contents of the NAVT.

17. The node as claimed in claim 16 in a distributed wireless mobile communication system using no channel splitting, wherein the receiving device is for determining whether the NAVT is empty or not when the RTS packet is received; and sending a CTS packet back to the transmitting after determining that the NAVT is empty.

18. The node as claimed in claim 17, wherein the transmitting device comprising:

a transmitting storage unit to store data packet that arrives at the node;

a detection device to determine whether a packet is to be transmitted in the transmitting storage unit, and check items of the NAVT in the NAVT storage timer unit;

a determining unit to determine whether a CTS item is contained in the NAVT and whether the NAVT is empty or not based on the result from the detection unit;

a channel sensing device to sense the channel to determine whether the channel is busy or not based on the result from the determining unit;

a data length fitting unit to fit a data length after determining by the channel sensing device that the channel is busy; and a transmitting unit to transmit a RTS packet to the receiving side after determining by the channel sensing unit that the channel is busy in the case that only RTS item is contained in the NAVT; sending a RTS packet after the channel is idle for the duration of the distributed coordination function interframe space (DIFS) period, entering a backoff procedure, and sending a RTS packet after the termination of the backoff procedure; and transmitting a data packet to the receiving side when the transmitting node receives a CTS from the receiving node, and transmitting a CTS or acknowledge (ACK) packet to the transmitting side when the receiving node receives a RTS packet and a DATA packet from the transmitting node.

19. The node as claimed in claim 17 or 18, wherein the receiving device comprising:

a receiving storage unit to store a packet received externally;

a receiving unit to receive a RTS and data packet from the transmitting side, and receiving a CTS and ACK packet from the receiving side;

a detection unit to detect the correct reception for packet or packet collision, detecting whether the node is a receiving node or not when a RTS packet and data packet is received; detecting whether the node is a transmitting node or not when a CTS and ACK packet is received; and detecting whether the NAVT is empty or not when a RTS packet is received;

a channel sensing unit to sense the channel and transmit a CTS packet when the received result indicates that the node is a receiving node and the NAVT is empty;

an updating unit to update the NAVT when a non-receiving node or a non-transmitting side received a packet based on a determination from the determination unit; and a determination unit to make a determination based on the result from the detection unit; transmitting the determination result to the updating unit when the node is a non-receiving node and a packet is received; transmitting the determination result to the updating unit when the node is a non-transmitting node and a packet is received; and transmitting the determination result to the channel sensing unit when the node is a receiving node and the NAVT is empty; and assuming that the CTS or ACK packet from the receiving node is correctly received when the detecting unit detects that a packet collision occur during a certain time.

20. The node as claimed in claim 17, wherein operation is terminated when the receiving device in the receiving node determines that the NAVT is not empty.

21. The node as claimed in claim 16 using channel splitting, wherein the transmitting device further is for sending a data channel (DCH) to determine whether the DCH is busy when only the RTS item is contained in the NAVT; and to fit a data length and send a RTS packet on signaling channel (SCH) after determining that the DCH is busy; and a receiving device further is to determine whether only a CTS item is contained in NAVT when the receiving node receives a RTS packet; and to fit a data length and send a CTS packet on the SCH back to the transmitting side after determining that only the CTS item is contained in the NAVT or the NATV is empty.

22. The node as claimed in claim 21, wherein the transmitting device comprising:

a transmitting storage to store data packet that arrives at the node;

a detection unit to determine whether a packet is to be transmitted in the transmitting storage unit and to check items of the NAVT stored in the NAVT storage timer unit for;

a determination unit to determine whether a CTS item is contained in the NAVT and whether the NAVT is empty or not based on the result from the detection unit;

a first channel selecting unit to select a channel based on the result from the determination unit; selecting a SCH for sensing when the NAVT is empty, or to select a DCH for sensing when only RTS item is contained in the NAVT;

a channel sensing unit to sense the channel to determine whether the channel is busy or not based on the selection by the first channel selecting unit;

a data length fitting unit to fit a data length when it is determined by the channel sensing means that the channel is busy;

a second channel selecting unit to select a SCH when a RTS packet is to be transmitted, and selecting a DCH when a data packet is to be transmitted; and a transmitting unit to transmit a RTS packet on the SCH to the receiving side when it is determined by the channel sensing unit that the DCH is busy in the case that only RTS item is contained in the NAVT; to send a RTS packet on the SCH after the channel is idle for the duration of the DIFS period, otherwise, to enter a backoff procedure and send a RTS packet on the SCH after the termination of the backoff procedure; and to transmit a data packet on the DCH to the receiving side when the transmitting node receives a CTS from the receiving node, and transmitting a CTS or ACK packet to the transmitting side when the receiving node receives a RTS packet and a DATA packet from the transmitting node.

23. The node as claimed in claim 21 or 22, wherein the receiving device comprising:

a receiving storage unit to store a packet received externally;

a receiving unit to receive a RTS packet from the transmitting side on the SCH; to receive a data packet from the transmitting side on the DCH, and to receive a CTS and REJ packet from the receiving side on the SCH;

a detection unit to detect the correct reception for packet, to detect whether the node is a receiving node or not when a RTS packet and data packet is received on the SCH; to detect whether the node is a transmitting node or not when a CTS and ACK packet is received on the SCH; and to detect whether a RTS item is contained in the NAVT and whether the NAVT is empty or not when a RTS packet is received;

a data length fitting unit to fit a data length when the NAVT is not empty;

a third channel selecting unit to select a SCH when a CTS and REF packet is to be transmitted, and selecting a DCH when a data packet is to be transmitted;

a channel sensing unit to sense channel to transmit a CTS packet when the received result indicates that the node is a receiving node and no RTS item is contained in the NAVT;

an updating unit to update the NAVT when a non-receiving node or a non-transmitting node received a packet based on a determination from the determination unit; and a determination unit to make a determination based on the result from the detection device; transmitting the determination result to the updating means when the node is a non-receiving node and a RTS packet is received; transmitting the determination result to the updating means when the node is a non-transmitting node and a CTS packet is received; and transmitting the determination result to the data length fitting unit when the node is a receiving node and only CTS item is contained in the NAVT.

24. The node as claimed in claim 19 or 23, wherein when a non-receiving node receives a RTS packet, the updating unit determines whether a RTS item is contained in the NAVT; a RTS item is added in the NAVT and the duration in the received RTS packet is duplicated into the duration field of the RTS item in the NAVT when no RTS item is contained in the NAVT; the larger one between the duration in the received RTS packet and the duration of the RTS item stored in the NAVT is selected to update the duration of the RTS item in the NAVT when the RTS item is contained in the NAVT.

25. The node as claimed in claim 19 or 23, wherein when a non-transmitting node receives a CTS packet, the updating unit determines whether a RTS item is contained in the NAVT; a CTS item is added in the NAVT and the duration in the received CTS packet is duplicated into the duration field of the CTS item in the NAVT when no CTS item is contained in the NAVT; the larger one between the duration in the received CTS packet and the duration of the CTS item stored in the NAVT is selected to update the duration of the CTS item in the NAVT when the CTS item is contained in the NAVT.

26. The node as claimed in claim 17 or 21, wherein the NAVT storage timer unit includes a timer unit to control the value of the duration field in the NAVT.

27. The as claimed in claim 17 or 21, wherein the NAVT is a two-dimension data table, wherein the packet type field indicates packet types including a RTS item and a CTS item, and the duration field indicates the duration time for CTS item and the RTS item.

28. The node as claimed in claim 17 or 21, wherein when the value of the duration field is reduced to zero, the RTS item or the CTS item in the NAVT corresponding to this duration is emptied by the receiving device in the node.

29. The node as claimed in claim 21, wherein when the receiving device in the receiving node determines that a RTS item is contained in the NAVT, the transmitting device in the node transmits on the SCH a REJ packet indicating the rejection of a response to the packet transmitted by the transmitting side during the time indicated by the duration field of the REJ packet, wherein the value of the duration field is equal to the subtraction of the time necessary for transmitting the REJ packet on the SCH from the duration of the CTS item in the NAVT.

* * * * *